United States Patent
Ikeda et al.

(10) Patent No.: US 9,458,835 B2
(45) Date of Patent: Oct. 4, 2016

(54) CONDITION MONITORING SYSTEM

(71) Applicants: Hiroshi Ikeda, Kuwana (JP); Takashi Haseba, Kuwana (JP); Akitoshi Takeuchi, Kuwana (JP)

(72) Inventors: Hiroshi Ikeda, Kuwana (JP); Takashi Haseba, Kuwana (JP); Akitoshi Takeuchi, Kuwana (JP)

(73) Assignee: NTN Corporation, Osaka (JP)

( * ) Notice: Subject to any disclaimer, the term of this patent is extended or adjusted under 35 U.S.C. 154(b) by 28 days.

(21) Appl. No.: 14/383,819

(22) PCT Filed: Feb. 19, 2013

(86) PCT No.: PCT/JP2013/053960
§ 371 (c)(1),
(2) Date: Sep. 8, 2014

(87) PCT Pub. No.: WO2013/133002
PCT Pub. Date: Sep. 12, 2013

(65) Prior Publication Data
US 2015/0116131 A1 Apr. 30, 2015

(30) Foreign Application Priority Data

Mar. 8, 2012 (JP) .................................. 2012-051697
Jul. 17, 2012 (JP) .................................. 2012-158641

(51) Int. Cl.
*G08C 19/22* (2006.01)
*F03D 11/00* (2006.01)
(Continued)

(52) U.S. Cl.
CPC ........... *F03D 11/0091* (2013.01); *F03B 17/00* (2013.01); *G05B 23/0235* (2013.01); *F05B 2260/83* (2013.01); *Y02E 10/722* (2013.01)

(58) Field of Classification Search
CPC .......... F03D 11/0091; G05B 23/0235; F05B 2260/83; Y02E 10/722
USPC ..................................................... 340/870.07
See application file for complete search history.

(56) References Cited

U.S. PATENT DOCUMENTS

2002/0013635 A1* 1/2002 Gotou ................. G01M 13/045
700/108
2004/0151578 A1 8/2004 Wobben
(Continued)

FOREIGN PATENT DOCUMENTS

JP 2002-217814 A 8/2002
JP 2002-349415 A 12/2002
(Continued)

OTHER PUBLICATIONS

International Search Report issued in International Application No. PCT/JP2013/053960 mailed May 14, 2013, with English translation.
(Continued)

*Primary Examiner* — Juan A Torres
(74) *Attorney, Agent, or Firm* — McDermott Will & Emery LLP

(57) ABSTRACT

A condition monitoring system that diagnoses an abnormality of an apparatus provided in a wind turbine includes a monitoring apparatus including a sensor provided for the apparatus, a monitoring-side control apparatus that sets a threshold value to be used by the monitoring apparatus for diagnosing the abnormality of the apparatus, and diagnoses the abnormality of the apparatus based on the threshold value, and a monitoring terminal that monitors a condition of the apparatus. The condition monitoring system can correctly diagnose an abnormality of the apparatus provided in the wind turbine.

13 Claims, 11 Drawing Sheets

(51) Int. Cl.
  *G05B 23/02* (2006.01)
  *F03B 17/00* (2006.01)

(56) References Cited

U.S. PATENT DOCUMENTS

| | | | |
|---|---|---|---|
| 2008/0234964 A1 | 9/2008 | Miyasaka et al. | |
| 2009/0030752 A1 | 1/2009 | Senturk-Doganaksoy et al. | |
| 2010/0138182 A1* | 6/2010 | Jammu | F03D 7/026 702/113 |
| 2011/0125419 A1 | 5/2011 | Bechhoefer et al. | |
| 2011/0293417 A1 | 12/2011 | Watanabe | |
| 2011/0304140 A1* | 12/2011 | Minami | F03D 7/0224 290/44 |
| 2012/0130678 A1* | 5/2012 | Ishioka | F03D 11/0091 702/179 |

FOREIGN PATENT DOCUMENTS

| | | | |
|---|---|---|---|
| JP | 2002349415 A | * | 12/2002 |
| JP | 2004-525295 A | | 8/2004 |
| JP | 2005-237338 A | | 9/2005 |
| JP | 2006-105956 A | | 4/2006 |
| JP | 2008-144682 A | | 6/2008 |
| JP | 2008-171403 A | | 7/2008 |
| JP | 2009-075081 A | | 4/2009 |
| JP | 2009-243428 A | | 10/2009 |
| JP | 2009243428 A | * | 10/2009 |
| JP | 2010-281279 A | | 12/2010 |
| JP | 2011-190762 A | | 9/2011 |
| JP | 2011-202626 A | | 10/2011 |
| JP | 3176292 U | | 6/2012 |
| WO | 2011/023596 A1 | | 3/2011 |
| WO | 2011/151875 A1 | | 12/2011 |

OTHER PUBLICATIONS

Extended European Search Report issued in European Application No. 13758332.4 dated Sep. 17, 2015.
Japanese Office Action issued in Application No. 2012-158641 dated Mar. 29, 2016, with English translation.

* cited by examiner

FIG.3

| PART | FAILURE MODE | SENSOR | DIAGNOSTIC PARAMETER |
|---|---|---|---|
| MAIN BEARING | SHAFT DAMAGE | VIBRATIONS (HIGH) | ROOT-MEAN-SQUARE (RMS) VALUE |
| MAIN BEARING | UNBALANCED | VIBRATIONS (LOW) | FIRST ORDER ROTATIONAL FREQUENCY COMPONENT |
| MAIN BEARING | UNBALANCED | VIBRATIONS (LOW) | SECOND ORDER ROTATIONAL FREQUENCY COMPONENT |
| MAIN BEARING | UNBALANCED | VIBRATIONS (LOW) | THIRD ORDER ROTATIONAL FREQUENCY COMPONENT |
| MAIN BEARING | MISALIGNED | VIBRATIONS (LOW), AXIAL DIRECTION | FIRST ORDER ROTATIONAL FREQUENCY COMPONENT |
| MAIN BEARING | MISALIGNED | VIBRATIONS (LOW), AXIAL DIRECTION | SECOND ORDER ROTATIONAL FREQUENCY COMPONENT |
| MAIN BEARING | MISALIGNED | VIBRATIONS (LOW), AXIAL DIRECTION | THIRD ORDER ROTATIONAL FREQUENCY COMPONENT |
| GEAR BOX | SHAFT DAMAGE | VIBRATIONS (HIGH) | ROOT-MEAN-SQUARE (RMS) VALUE |
| GEAR BOX | GEAR DAMAGE | VIBRATIONS (HIGH) | FIRST ORDER GEAR MESHING FREQUENCY |
| GEAR BOX | GEAR DAMAGE | VIBRATIONS (HIGH) | SECOND ORDER GEAR MESHING FREQUENCY |
| GEAR BOX | GEAR DAMAGE | VIBRATIONS (HIGH) | THIRD ORDER GEAR MESHING FREQUENCY |
| POWER GENERATOR | SHAFT DAMAGE | VIBRATIONS (HIGH) | ROOT-MEAN-SQUARE (RMS) VALUE |
| NACELLE | ABNORMAL VIBRATIONS | VIBRATIONS (LOW) | LOW FREQUENCY VIBRATION COMPONENT |
| NACELLE | ABNORMAL VIBRATIONS | VIBRATIONS (LOW), AXIAL DIRECTION | LOW FREQUENCY VIBRATION COMPONENT |

1: VIBRATIONS (HIGH): HIGH FREQUENCY VIBRATION SENSORS ATTACHED IN THE RADIAL DIRECTION
2: VIBRATIONS (LOW): LOW FREQUENCY VIBRATION SENSORS ATTACHED IN THE RADIAL DIRECTION
3: VIBRATIONS (LOW), AXIAL DIRECTION: LOW FREQUENCY VIBRATION SENSORS ATTACHED IN THE AXIAL DIRECTION

CONDITION MONITORING SYSTEM

RELATED APPLICATIONS

This application is the U.S. National Phase under 35 U.S.C. §371 of International Application No. PCT/JP2013/053960, filed on Feb. 19, 2013, which in turn claims the benefit of Japanese Application No. 2012-051697, filed on Mar. 8, 2012, and Japanese Application No. 2012-158641, filed Jul. 17, 2012, the disclosures of which are incorporated by reference herein.

TECHNICAL FIELD

This invention relates to condition monitoring systems, and particularly to a condition monitoring system that monitors the condition of a main shaft bearing, a gearbox, a generator, or the like of a wind turbine.

BACKGROUND ART

A wind turbine generates power by rotating the main shaft connected to blades subjected to winds, increasing the rotation of the main shaft with the gearbox, and rotating the rotor of the power generator. Technologies as described below are known as abnormality diagnosing apparatuses that diagnose an abnormality of the main shaft hearing, the gearbox, the power generator, or the like.

Japanese Patent Laying-Open No. 2009-243428 (PTD 1) discloses an apparatus for monitoring a wind turbine. This apparatus for monitoring a wind turbine monitors the condition of the wind turbine by using characteristic values generated based on measurement data measured by a plurality of sensors provided in the wind turbine. The monitoring apparatus includes first storage means that stores a plurality of characteristic values associated with a measured time for each characteristic item, wherein, when characteristic values associated with the same measured time are defined as a single data set, the data set is stored with identification information indicating a classification determined in accordance with a characteristic value of a predetermined characteristic item; second storage means that stores a plurality of characteristic values associated with a measured time for each characteristic item, wherein, when characteristic values associated with the same measured time are defined as a single data set, the data set is stored with identification information indicating a classification determined in accordance with a characteristic value of a predetermined characteristic item, and the characteristic value of the specific characteristic item forming the data set falls within a predetermined reference range defined in advance; diagnostic setting means that extracts and sets a plurality of data sets to be used for a diagnosis from the first storage means, and extracts and sets a plurality of data sets to be used for the diagnosis from the second storage means; index value calculating means that calculates a condition index value that represents the condition of the wind turbine, by using a statistical calculation technique, based on the data sets of a data file to be diagnosed set by the diagnostic setting means and data sets of a reference data file; evaluating means that evaluates the condition of the wind turbine based on the condition index value calculated by the index value calculating means; and notifying means that notifies a result evaluated by the evaluating means.

This monitoring apparatus can automatically monitor the condition of the wind turbine, and quantitatively evaluate the condition based on an appropriate reference (see Japanese Patent Laying-Open No. 2009-243428).

CITATION LIST

Patent Document

PTD 1: Japanese Patent Laying-Open No. 2009-243428

SUMMARY OF INVENTION

Technical Problem

The above-described monitoring apparatus disclosed in PTD 1 (Japanese Patent Laying-Open No. 2009-243428), however, automatically performs all diagnoses without a specialist being involved, and thus, may have an error in diagnosis. Diagnostic accuracy is needed particularly for monitoring of the condition of a wind turbine, which requires a high-level diagnosis, and thus, a specialist's diagnosis is required.

However, having a specialist analyzing data transmitted from the monitoring apparatus all the time leads to high costs, and is not realistic.

Accordingly, this invention was made to solve the aforementioned problem, and an object of the invention is to provide a condition monitoring system capable of correctly diagnosing an abnormality of an apparatus included in a wind turbine.

Solution to Problem

In summary, this invention provides a condition monitoring system that diagnoses an abnormality of an apparatus provided in a wind turbine. The condition monitoring system includes a monitoring apparatus including a sensor provided for the apparatus, a monitoring-side control apparatus, and a monitoring terminal. The monitoring apparatus transmits data measured in a first period before diagnosis to the monitoring-side control apparatus. The monitoring-side control apparatus generates a threshold value based on the transmitted data. Then, in a second period after passage of the first period, the monitoring-side control apparatus diagnoses whether the apparatus has an abnormality or not based on the data collected by the monitoring apparatus and the threshold value corresponding to the data. A diagnostic result is displayed on the monitoring terminal.

Preferably, the data for setting a threshold value is measured for each operation condition of the wind turbine, the threshold value is determined for each operating condition, and the operation condition is defined as at least any one of physical quantities representing a wind velocity, a rotational speed of a main shaft, a rotational speed of a power generator shaft, an amount of power generated, and a torque of the power generator shaft.

Preferably, the data includes data on at least one of vibrations of the apparatus, an acoustic emission generated from the apparatus, a temperature of the apparatus, and an operating sound of the apparatus.

Preferably, the data is converted into a diagnostic parameter representing a condition of the apparatus, and the diagnostic parameter includes any one of a root-mean-square value, a peak value, an average value, a crest factor, a root-mean-square value after envelope processing, and a peak value after envelope processing.

Preferably, the monitoring apparatus includes a transmission unit connectable to the Internet, the transmission unit transmits the data for setting the threshold value, and the monitoring-side control apparatus generates the threshold value from the data for setting the threshold value, by using a statistical method.

Preferably, the condition monitoring system monitors a plurality of the apparatuses, the condition monitoring system further includes a monitoring terminal that controls the monitoring apparatus, the monitoring terminal includes a display that displays the diagnostic result, and the display displays an apparatus diagnosed by the monitoring-side control apparatus as having an abnormality in the second period, as well as information on the abnormality of the apparatus.

More preferably, the display displays the data corresponding to the same operation condition with passage of time.

Still more preferably, the data for setting the threshold value is measured for each operation condition of the wind turbine, the threshold value is determined for each operating condition, and the display simultaneously displays a frequency spectrum of latest data out of the data, and a frequency spectrum of data stored in the monitoring-side control apparatus corresponding to the same operation condition as the operation condition of the data, and determined until now as being normal using the threshold value.

Even more preferably, the data for setting the threshold value is measured for each operation condition of the wind turbine, the threshold value is determined for each operating condition, and the display simultaneously displays a frequency spectrum after envelope processing of latest data out of the data, and a frequency spectrum after envelope processing of data stored in the monitoring-side control apparatus corresponding to the same operation condition as the operation condition of the data, and determined until now as being normal using the threshold value.

Still more preferably, the display simultaneously displays the frequency spectrum after envelope processing of the data, as well as a ball pass frequency of inner race, a ball pass frequency of outer race, and a ball spin frequency calculated in advance.

Even more preferably, the display displays the frequency spectrum of the data, as well as a rotational frequency and a gear meshing frequency related to an imbalance and a misalignment.

Still more preferably, the display displays the frequency spectrum after envelope processing of the data and the gear meshing frequency.

Preferably, the condition monitoring system further includes a monitoring terminal that controls the monitoring apparatus, wherein the threshold value to be used by the monitoring-side control apparatus for the diagnosis can be modified via the monitoring terminal.

Advantageous Effects of Invention

In accordance with this invention, an accurate diagnosis can be made as to whether an apparatus provided in the wind turbine is in an abnormal condition or not. Moreover, data on the condition of the wind turbine can be readily presented to a specialist for a detailed diagnosis in a short time. Furthermore, costs can be reduced without having a specialist all the time.

BRIEF DESCRIPTION OF DRAWINGS

FIG. 3 is a diagram for use in explaining relationships between items of data used in the embodiment.

DESCRIPTION OF EMBODIMENTS

Figure 1:
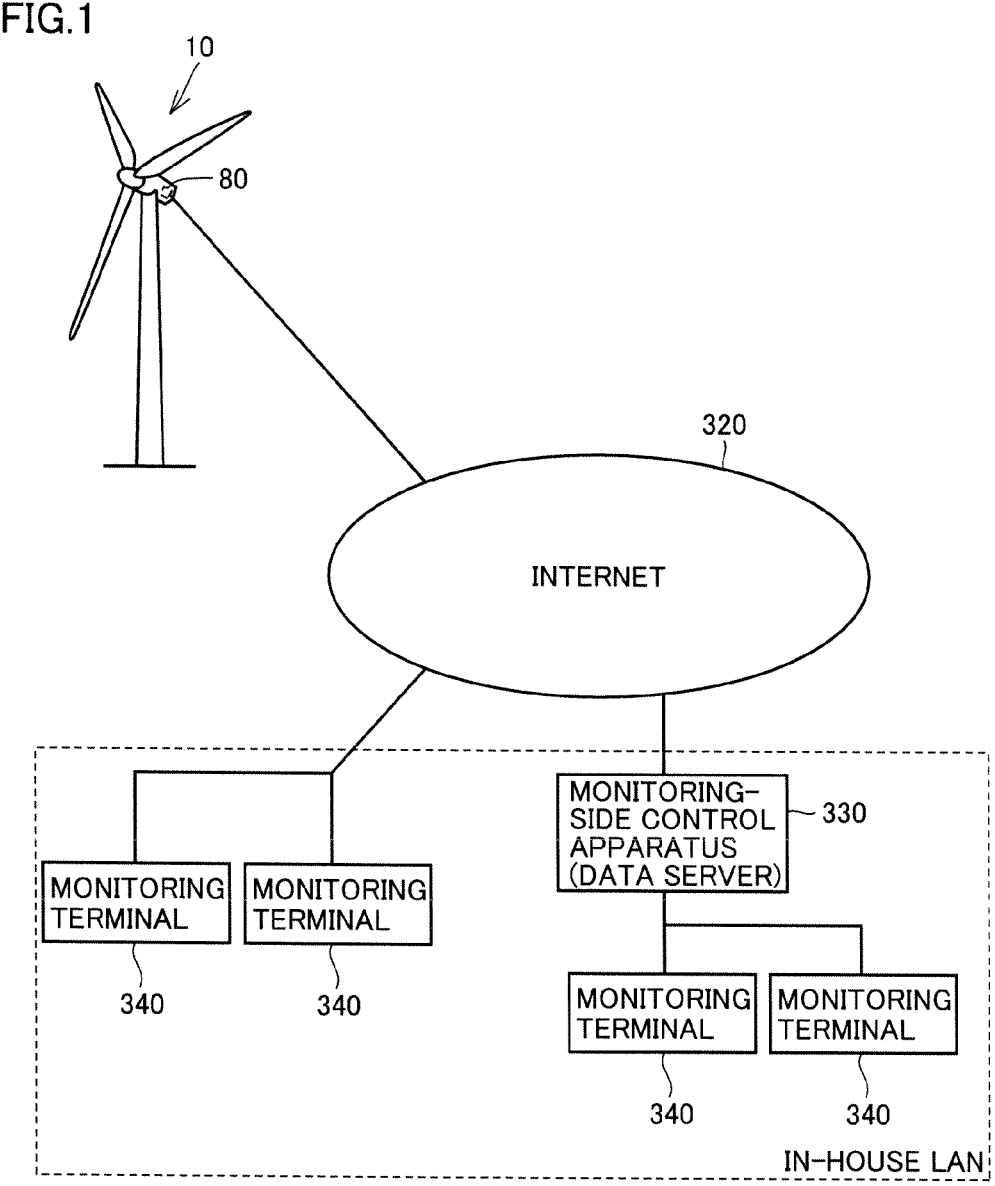
FIG. 1 is a diagram schematically illustrating the overall configuration of a condition monitoring system according to an embodiment of the present invention.

The present invention will be hereinafter described in detail referring to the drawings. In the drawings, identical or corresponding parts are indicated with identical numerals, and description thereof will not be repeated.

First Embodiment

Overall Configuration of Condition Monitoring System

FIG. 1 is a diagram schematically illustrating the overall configuration of a condition monitoring system according to an embodiment of the present invention. Referring to FIG. 1, the condition monitoring system includes a monitoring apparatus 80, a data server (monitoring-side control apparatus) 330, and a monitoring terminal 340.

Monitoring apparatus 80 includes sensors 70A to 70H (FIG. 2) described below. Monitoring apparatus 80 calculates a root-mean-square value, a peak value, a crest factor, a root-mean-square value after envelope processing, a peak value after envelope processing, or the like from a detected value detected by each of the sensors, and transmits it to data server 330 via the Internet 320.

The communication between monitoring apparatus 80 and data server 330 is described herein as wired communication; however, the invention is not limited thereto, and the communication may also be wireless communication.

Data server 330 and monitoring terminal 340 are connected to each other with an in-house LAN (Local Area Network), for example. Monitoring terminal 340 allows browsing of measurement data received by data server 330, a detailed analysis of the measurement data, changing of settings on the monitoring apparatus, and displaying of the condition of each apparatus of the wind turbine.

<Configuration of Wind Turbine>

Figure 2:
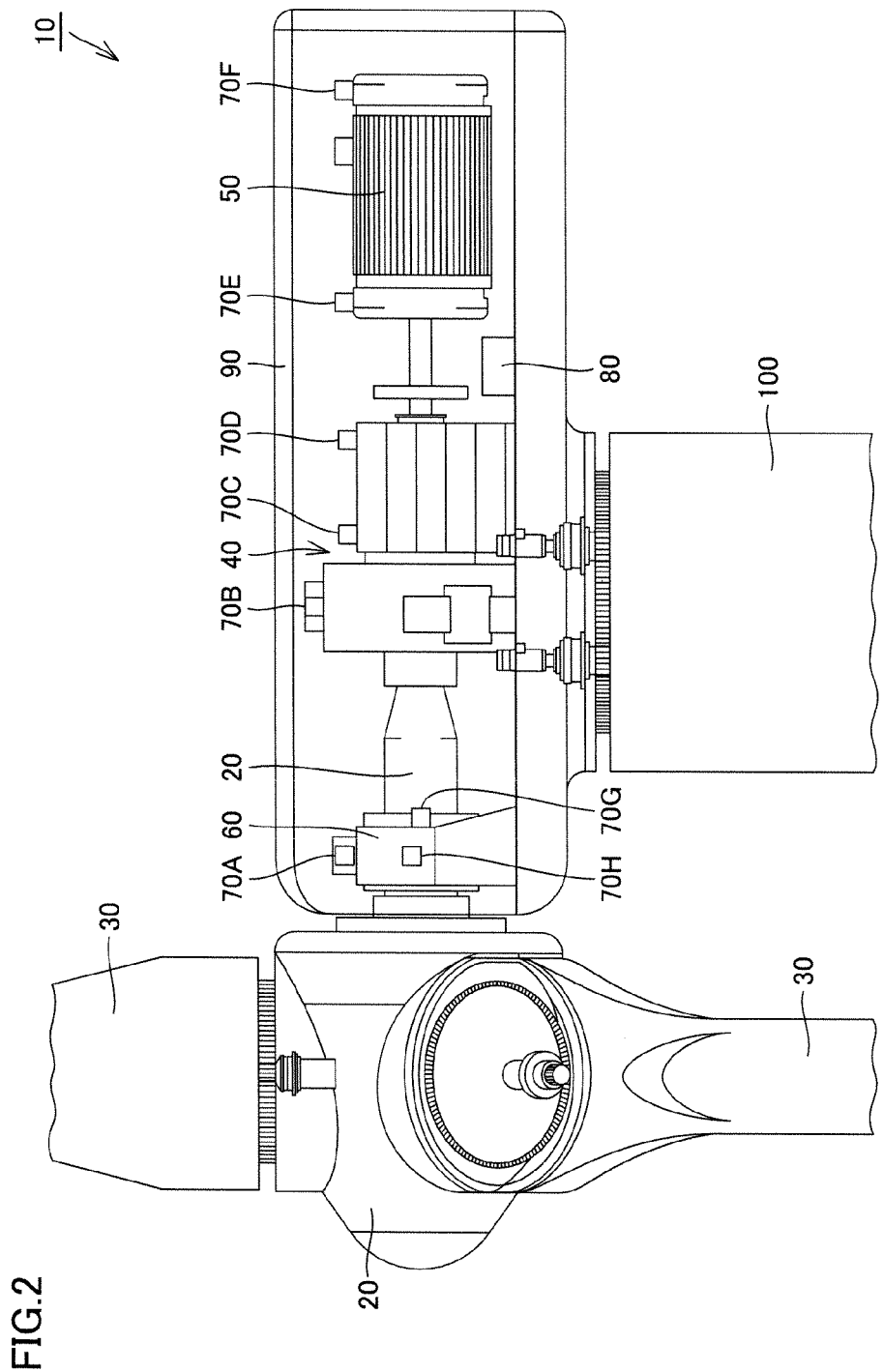
FIG. 2 is a diagram schematically illustrating the configuration of a wind turbine 10.

FIG. 2 is a diagram schematically illustrating the configuration of a wind turbine 10. Referring to FIG. 2, wind turbine 10 includes a main shaft 20, blades 30, a gearbox 40, power generator 50, and a main bearing 60. Wind turbine 10 includes sensors 70A to 70H and monitoring apparatus 80. Gearbox 40, power generator 50, main bearing 60, sensors 70A to 70H, and monitoring apparatus 80 are housed in a nacelle 90, which is supported by a tower 100.

Main shaft 20 enters nacelle 90, where it is connected to an input shaft of gearbox 40, and is rotatably supported by main bearing 60. Main shaft 20 transmits a rotational torque generated by blades 30 subjected to winds to the input shaft of gearbox 40. Blades 30 are provided on a tip of main shaft 20. Blades 30 convert wind power into a rotational torque, which is transmitted to main shaft 20.

Main bearing 60, which is fixed in nacelle 90, rotatably supports main shaft 20. Main bearing 60 is formed of a rolling hearing, for example, a self-aligning roller bearing, a conical roller hearing, a cylindrical roller bearing, or a ball bearing. Such a bearing may be a single-row or multi-row bearing.

Sensors 70A to 70H are fixed to various apparatuses inside nacelle 90. Specifically, sensor 70A is fixed on an upper surface of main bearing 60 to monitor the condition of main shaft 60. Sensors 70B to 70D are fixed on an upper surface of gearbox 40 to monitor the condition of gearbox 40. Sensors 70E and 70F are fixed on an upper surface of power generator 50 to monitor the condition of power generator 50. Sensor 70G is fixed on main shaft 60 to monitor a misalignment and abnormal vibrations of the nacelle. Sensor 70H is fixed on main shaft 60 to monitor an imbalance and abnormal vibrations of the nacelle.

Gearbox 40 is provided between main shaft 20 and power generator 50, and increases the rotational speed of main shaft 20 and outputs the increased rotational speed to power generator 50. As one example, gearbox 40 is formed of a speed-increasing gear mechanism including a planetary gear, an intermediate shaft, a high speed shaft, and the like. A plurality of bearings that rotatably support the shafts are also provided within gearbox 40, although not illustrated. Power generator 50 is connected to an output shaft of gearbox 40, and generates power with the rotational torque received from gearbox 40. Power generator 50 is formed of an induction generator, for example. A bearing that rotatably supports the rotor is also provided within power generator 50.

Monitoring apparatus 80 is provided inside nacelle 90, and receives data such as vibrations, a sound, an AE (Acoustic Emission), or the like of each apparatus detected by each of sensors 70A to 70H. Sensors 70A to 70H and monitoring apparatus 80 are connected via cables, although not illustrated.

A program that at least allows browsing of measurement data stored in data server 330, a detailed analysis of the measurement data, changing of settings on the monitoring apparatus, and displaying of the condition of each apparatus of wind turbine 10 is stored in advance in monitoring terminal 340. Data on each apparatus of wind turbine 10 that assists a specialist of wind turbine 10 in judging is displayed on monitoring terminal 340.

It is noted that each structural element forming monitoring terminal 340 is a general element. An essential part of the present invention may therefore lie in the above-described software (program) stored in a storage medium.

<Relationship Between Diagnostic Parameter and Failure Mode>

FIG. 3 is a diagram for use in explaining relationships between items of data used in the embodiment. Referring to FIG. 3, an abnormality determination is made by comparing an item measured (measurement item) by each of the sensors, a diagnostic parameter calculated from the data on this measurement item, the value of this parameter, and a threshold value thereof. FIG. 3 shows relationships between parts of wind turbine 10 having an abnormality, and failure modes of these parts.

Specifically, as illustrated in FIGS. 2 and 3, monitoring apparatus 80 calculates a root-mean-square value from the data measured by high frequency vibration sensor 70A fixed on main shaft 60. Where the root-mean-square value exceeds a corresponding threshold value, monitoring terminal 340 displays that main shaft 60 has shaft damage.

With respect to main shaft 60, monitoring apparatus 80 also calculates a first order rotational frequency component, a second order rotational frequency component, and a third order rotational frequency component from the data measured by low frequency vibration sensor 70H attached to measure radial vibrations of the main shaft. Where each of the calculated rotational frequency components exceeds a corresponding threshold value, monitoring terminal 340 displays that main shaft 60 is unbalanced.

With respect to main shaft 60, monitoring apparatus 80 further calculates a first order rotational frequency component, a second order rotational frequency component, and a third order frequency component from the data measured by low frequency vibration sensor 70G attached to measure axial vibrations of the main shaft. Where each of the calculated rotational frequency components exceeds a corresponding threshold value, monitoring terminal 340 displays that main shaft 60 is misaligned.

With respect to gearbox 40, monitoring apparatus 80 calculates a root-mean-square value from the data measured by high frequency vibration sensors 70B to 70D. Where the root-mean-square value exceeds a corresponding threshold value, monitoring terminal 340 displays that gearbox 40 has shaft damage.

With respect to gearbox 40, monitoring apparatus 80 also calculates a first order gear meshing frequency component, a second order gear meshing frequency component, and a third order gear meshing frequency component of gears from the data measured by high frequency vibration sensors 70B to 70D. Where each of the calculated gear meshing frequency components exceeds a corresponding threshold value, monitoring terminal 340 displays that gearbox 40 has gear damage.

With respect to power generator 50, monitoring apparatus 80 calculates a root-mean-square value from the data measured by high frequency vibration sensors 70E and 70F. Where the root-mean-square value exceeds a corresponding threshold value, monitoring terminal 340 displays that power generator 50 has shaft damage.

With respect to nacelle 90, monitoring apparatus 80 calculates a low frequency vibration component from the data measured by low frequency vibration sensor 70H attached to measure radial vibrations of the main shaft. Where the calculated low frequency vibration component exceeds a corresponding threshold value, monitoring terminal 340 displays abnormal vibrations of nacelle 90.

With respect to nacelle 90, monitoring apparatus 80 also calculates a low frequency vibration component from the data measured by low frequency vibration sensor 70G attached to measure axial vibrations of the main shaft.

Where the calculated low frequency vibration component exceeds a corresponding threshold value, monitoring terminal 340 displays abnormal vibrations of nacelle 90.

The above-described measurement items are only some examples taken for easy understanding, and are not exclusive. A root-mean-square value, a peak value, an average value, a crest factor, a root-mean-square value after envelope processing, or a peak value after envelope processing may be calculated from measurement data measured by a vibration sensor, an AE sensor, a temperature sensor, or a sound sensor by using a statistical method, and the calculated value may be compared with a corresponding threshold value. In this way, the condition of each apparatus of wind turbine 10 can be comprehended, and the condition of the apparatus is displayed on monitoring terminal 340.

<Operation of Condition Monitoring System>

The operation of the condition monitoring system according to the first embodiment will be described hereinafter. The operation of the condition monitoring system includes processing performed in a basic data collection period for setting diagnostic operation conditions of wind turbine 10 (see FIG. 4), processing performed in a learning period, after the passage of the basic data collection period, for generating a threshold value for determining whether operation measurement data that satisfies the diagnostic operation conditions is abnormal or not (see FIG. 5), and processing performed in an operation period, after the passage of the learning period, for actually operating wind turbine 10, and monitoring the condition of wind turbine 10 by using the threshold value generated in the learning period (see FIG. 6).

(Processing in Basic Data Collection Period)

The basic data collection period refers to a period during which the basic data required to determine the diagnostic operation conditions of wind turbine 10 is collected. The processing in the basic data collection period will now be described.

Figure 4:
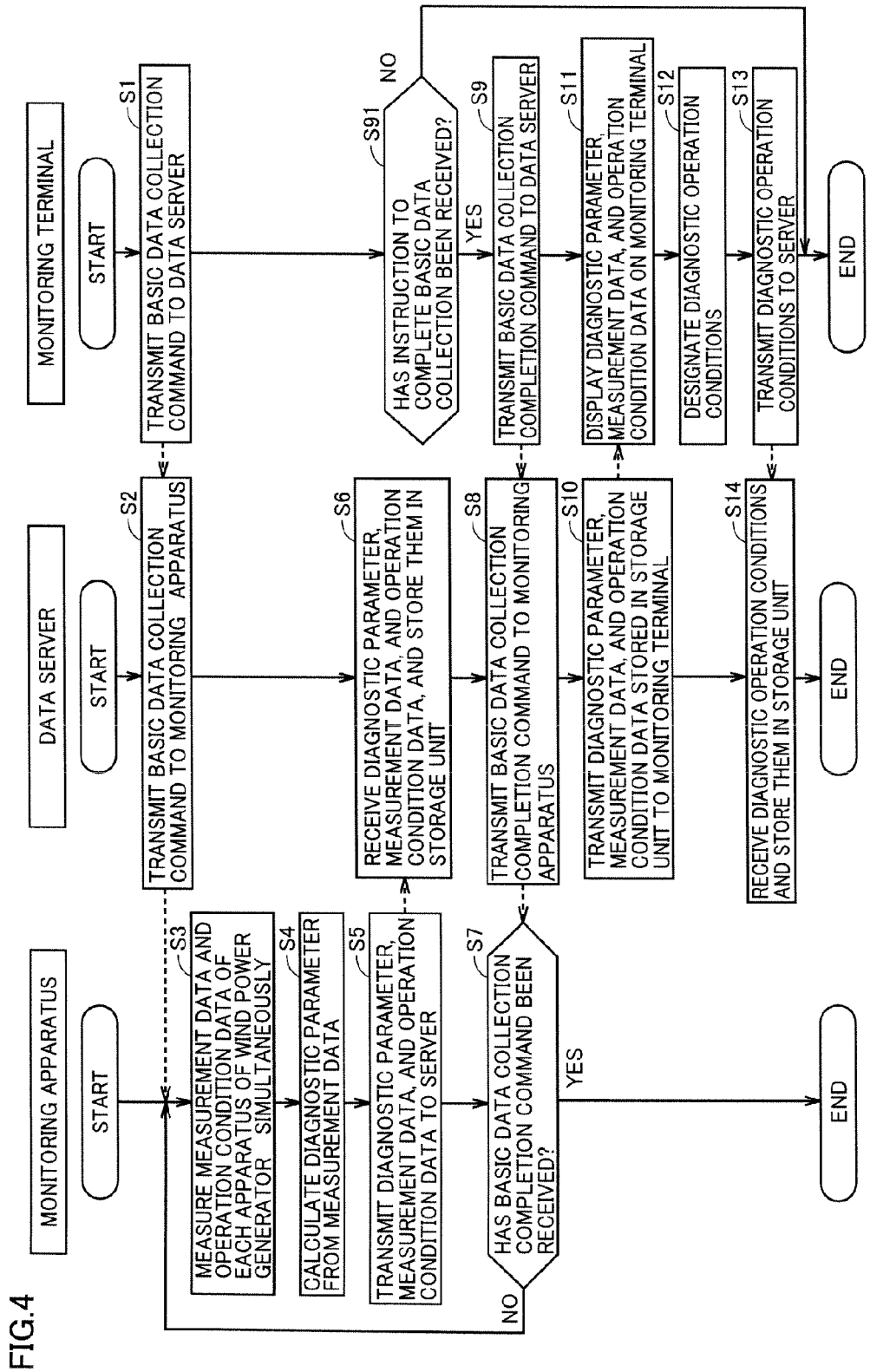
FIG. 4 is a flowchart for use in explaining the processing in a basic data collection period.

FIG. 4 is a flowchart for use in explaining the processing in the basic data collection period. Referring to FIG. 4, after the start of the operation of wind turbine 10, an operator causes monitoring terminal 340 to transmit a basic data collection command to data server 330 in step S1. The basic data collection command is then transmitted to monitoring apparatus 80 via data server 330 (step S2). Upon reception of the basic data collection command, monitoring apparatus 80 collects an item of data such as vibrations or the like of each apparatus of wind turbine 10 (hereinafter referred to as measurement data) and items of data on a rotational speed and a generated current (hereinafter referred to as operation condition data) simultaneously (step S3), calculates a diagnostic parameter from the measurement data, i.e., the item of data on vibrations or the like (step S4), and transmits the diagnostic parameter, the measurement data, and the operation condition data to data server 330 (step S5).

Data server 330 receives the diagnostic parameter, the measurement data, and the operation condition data, and stores them in the storage unit (step S6). Processing of measuring the measurement data and the operation condition data (step S3), calculating the diagnostic parameter (step S4), transmitting these items of data to data server 330 (step S5), and storing these items of data in data server 330 (step S6) is repeated (step S7; NO) until monitoring apparatus 80 receives a basic data collection completion command from monitoring terminal 340 at step S7.

It is noted that the operation condition data is not limited to the rotational speed and the generated current, and also includes physical quantities characterizing the operation condition of wind turbine 10, such as a wind velocity, a torque of the power generator shaft, and the like.

The measurement data is not limited to vibrations, and also includes physical quantities representing the condition of the apparatus, such as an AE, a temperature, a sound, and the like.

Where the operator gives the instruction to complete the basic data collection via monitoring terminal 340 (step S91; YES), the basic data collection completion command is transmitted to data server 330 from monitoring terminal 340 (step S9), and data server 330 transmits the basic data collection completion command to monitoring apparatus 80 (step S8). As described above, monitoring apparatus 80 then completes collection of the basic data to end the processing (step S7; YES). At the same time, data server 330 transmits all the diagnostic parameter, measurement data, and operation condition data collected in the basic data collection period to monitoring terminal 340 (step S10). Where the operator does not give the instruction to complete collection of the basic data via monitoring terminal 340 (step S91; NO), the processing ends.

Monitoring terminal 340 displays the diagnostic parameter, the measurement data, and the operation condition data (step S11), and the operator designates diagnostic operation conditions with reference to the diagnostic parameter and the operation condition data (step S12). As used herein, the diagnostic operation conditions are operation conditions to be diagnosed by the condition monitoring system. For example, when the diagnostic operation conditions are designated such that the rotational speed of the main shaft is 12 rpm to 17 rpm and the generated current is 300 A to 1000 A, items of data on the rotational speed and the generated current (operation condition data) are measured. Then, where the rotational speed of the main shaft of wind turbine 10 is within the range between 12 and 17 rpm and the generated current is within the range between 300 A and 1000 A, the operation conditions satisfy the diagnostic operation conditions. A diagnostic parameter is therefore calculated from the measurement data measured simultaneously, and a diagnosis is made by comparing the diagnostic parameter with a threshold value corresponding to the diagnostic parameter. Where the operation conditions do not satisfy the diagnostic operation conditions, a diagnosis of the condition of each apparatus of wind turbine 10 is not performed. It is noted that a plurality of conditions can be designated as the diagnostic operation conditions.

Monitoring terminal 340 transmits the designated diagnostic operation conditions to data server 330 (step S13), which then causes the diagnostic operation conditions to be stored in data server 330 (step S14). This completes the processing performed by monitoring terminal 340 and data server 330 in the basic data collection period.

(Processing in Learning Period)

The learning period refers to a period for generating a threshold value for determining the condition of each apparatus of wind turbine 10, after the passage of the above-described basic data collection period, which is needed to determine the diagnostic operation conditions of wind turbine 10. The processing in the learning period will now be described.

Figure 5:
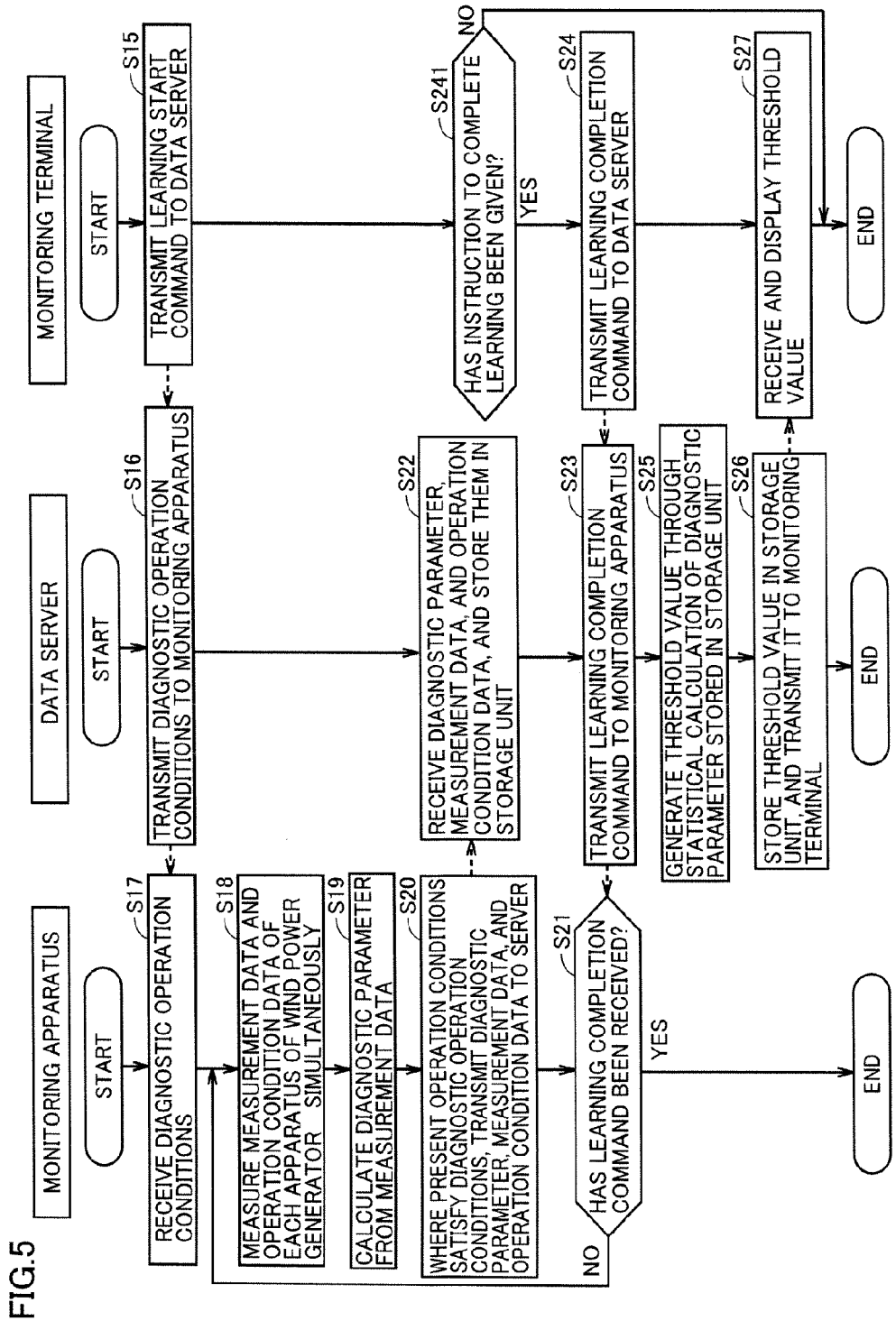
FIG. 5 is a flowchart for use in explaining the processing in a learning period of wind turbine 10.

FIG. 5 is a flowchart for use in explaining the processing in the learning period of wind turbine 10. Referring to FIG. 5, when the operator gives the instruction to start learning via monitoring terminal 340, a learning start command is transmitted from monitoring terminal 340 to data server 330 (step S15). Upon reception of the learning start command, data server 330 reads the diagnostic operation conditions stored in the storage unit, and transmits the diagnostic operation conditions to monitoring apparatus 80 (step S16). Monitoring apparatus 80 receives the diagnostic operation conditions (step S17), measures the measurement data and the operation condition data simultaneously (step S18), and calculates the diagnostic parameter from the measurement data, i.e., the item of data on vibrations or the like (step S19).

Where the present operation conditions satisfy the diagnostic operation conditions, the diagnostic parameter, the measurement data, and the operation condition data are transmitted to data server 330 (step S20). Processing of measuring the measurement data and the operation condition data (step S18), calculating the diagnostic parameter (step S19), transmitting these items of data to data server 330 (step S20), and storing these items of data in the storage unit in data server 330 (step S22) is repeated (step S21; NO) until monitoring apparatus 80 receives a learning completion command from monitoring terminal 340 at step S21.

Where the operator gives the instruction to complete learning via monitoring terminal 340 (step S241; YES), the learning completion command is transmitted to data server 330 from monitoring terminal 340 (step S24). Data server 330 transmits the learning completion command to monitoring apparatus 80 (step S23), which then completes collection of the measurement data and the operation condition data to end the processing (step S21; YES). At the same time, data server 330 automatically generates a threshold value of the diagnostic parameter for each of the diagnostic operation conditions, through a statistical calculation of the diagnostic parameter stored in the storage unit (step S25). The threshold value is stored in the storage unit of data server 330, and is transmitted to monitoring terminal 340 (step S26). Monitoring terminal 340 receives the threshold value, and displays it on the display such as a monitor or the like (step S27). The operator can thus check the threshold value on the display. This ends the processing by data server 330 and monitoring apparatus 80 in the learning period. Where the operator does not give the instruction to complete learning via monitoring terminal 340 (step S241; NO), the processing ends.

It is noted that the basic data collection period and the learning period for generating a threshold value can be changed as desired.

A threshold value is generated for each diagnostic operation condition for each apparatus of wind turbine 10, by using the measurement data obtained when each apparatus of each wind turbine 10 is in a normal condition.

For easy understanding here, the following describes a specific example where two levels of threshold values are generated for a single apparatus of a single wind turbine 10 under certain diagnostic operation conditions.

A plurality of values of diagnostic parameters are stored in the storage unit in step S22. The average value of the plurality of diagnostic parameters is denoted as $\mu_0$, and the standard deviation is denoted as $\sigma_0$. For example, assume that a first threshold value CT is $\mu_0+3\sigma_0$, and a second threshold value WN is three times the first threshold value. First threshold value CT and second threshold value WN are expressed by equations (1) and (2), respectively:

$$\text{threshold value } CT = \mu_0 + 3\sigma_0 \qquad (1); \text{ and}$$

$$\text{threshold value } WN = 3(\mu_0 + 3\sigma_0) \qquad (2).$$

Data server 330 determines whether each apparatus of wind turbine 10 is in an abnormal condition or not by using the below-described diagnostic parameter in the operation period, and using threshold values CT and WN. The result is then displayed on monitoring terminal 340. For example, where the measurement data exceeds threshold value CT, monitoring terminal 340 displays a sign such as "ATTENTION", for example, indicating that the corresponding apparatus is in an abnormal condition. Where the measurement data exceeds threshold value WN, monitoring terminal 340 displays a sign such as "WARNING", for example, indicating that the corresponding apparatus is in a condition with a higher degree of abnormality.

Because two levels of threshold values are separately provided as described above, when the measurement data is lower than threshold value CT, a specialist's judgment is not required. On the other hand, when the measurement data is higher than threshold value WN, the measurement data can be readily classified as requiring a careful judgment by a specialist on the condition of each apparatus of wind turbine 10. When the measurement data falls between threshold value CT and threshold value WN, a determination as to whether a diagnosis is to be made by a specialist can be made while observing the condition of each apparatus of wind turbine 10, for example.

The above-described configuration can reduce costs without having a specialist all the time.

While the number of the levels of threshold values is described as being two, the number of the levels of threshold values is not limited thereto, and more than two levels of threshold values may be set.

(Processing in Operation Period)

The operation period refers to a period after the passage of the learning period, for actually operating wind turbine 10, and monitoring the condition of wind turbine 10 using the threshold values generated in the learning period. The processing in the operation period will now be described.

Figure 6:
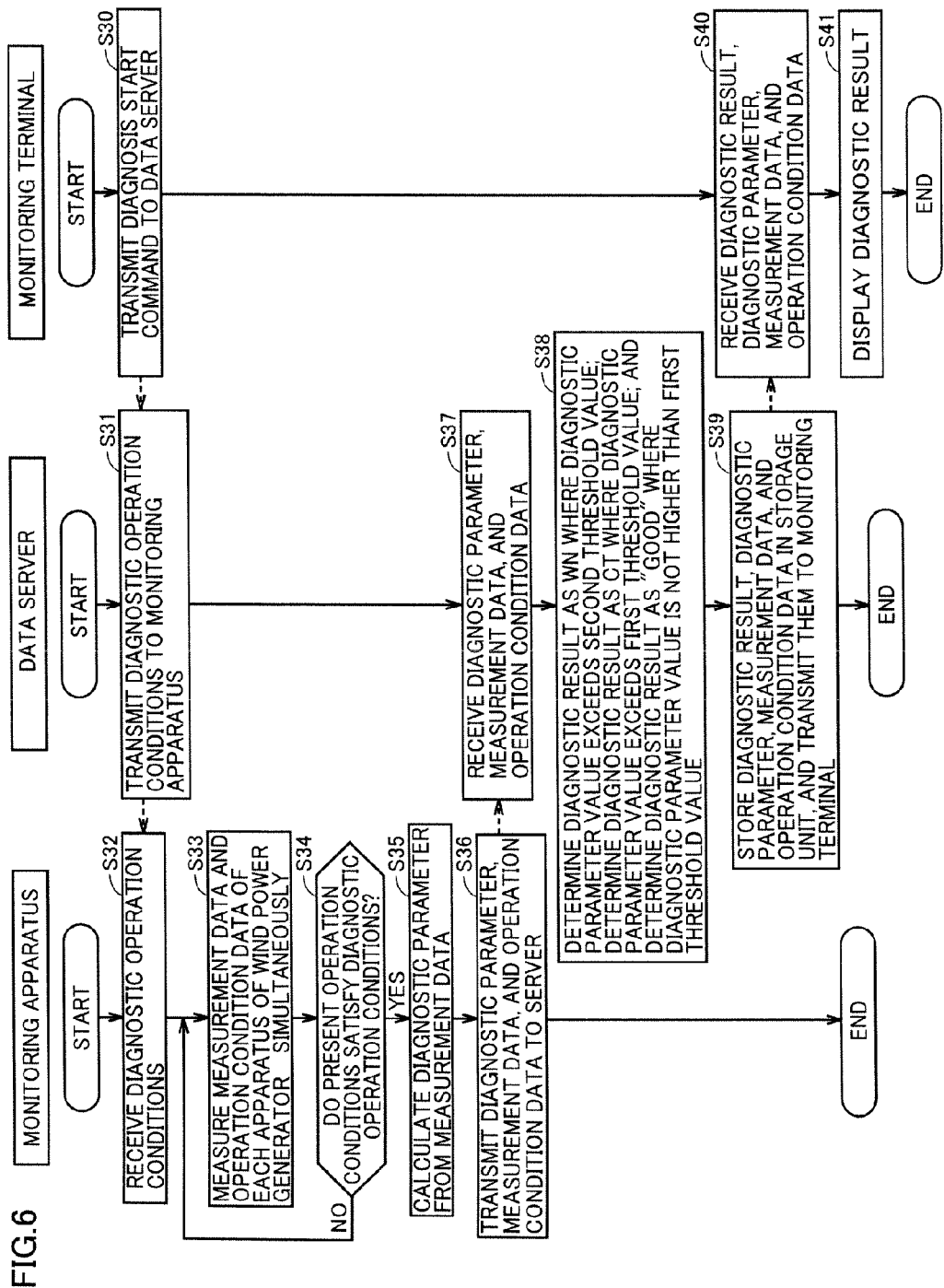
FIG. 6 is a flowchart for use in explaining the processing in an operation period.

FIG. 6 is a flowchart for use in explaining the processing in the operation period. Referring to FIG. 6, when the operator causes a command to start diagnosing the condition of each apparatus of wind turbine 10 (diagnosis start command) to be transmitted from monitoring terminal 340 to data server 330 (step S30), data server 330, which has received the diagnosis start command, transmits the diagnostic operation conditions to monitoring apparatus 80 (step S31).

Monitoring apparatus 80 receives the diagnostic operation conditions (step S32), and measures the measurement data such as vibration data of each apparatus of wind turbine 10 and the operation condition data such as a rotational speed of the main shaft, a current of the generator, and the like simultaneously (step S33).

Monitoring apparatus 80 determines whether the present operation conditions satisfy the diagnostic operation conditions or not (step S34). Where the present operation conditions satisfy the diagnostic operation conditions (step S34; YES), monitoring apparatus 80 calculates a diagnostic parameter from the measurement data (step S35), and transmits the diagnostic parameter, the measurement data, and the operation condition data to data server 330 (step S36). On the other hand, where the present operation conditions fail to satisfy the diagnostic operation conditions (step S34; NO), the processing returns to step S33, where the measurement data and the operation condition data are measured again.

Therefore, only where the present operation conditions satisfy the diagnostic operation conditions, the monitoring apparatus transmits the diagnostic parameter, the measurement data, and the operation condition data to data server 330.

Data server 330 receives these items of data (step S37). Data server 330 determines the condition of each apparatus of wind turbine 10, based on the diagnostic parameter and the threshold values generated in the learning period. For example, where the diagnostic parameter value exceeds second threshold value WN, data server 330 determines the diagnostic result as WN, and where the diagnostic parameter value exceeds first threshold value CT, data server 330 determines the diagnostic result as CT (step S38). This diagnostic result, the diagnostic parameter value, the measurement data, and the operation condition data are stored in the storage unit of data server 330, and these items of data are transmitted to monitoring terminal 340 (step S39).

Monitoring terminal 340 receives the diagnostic result, the diagnostic parameter value, the measurement data, and the operation condition data (step S40), and displays the diagnostic result. Monitoring terminal 340 displays the "WARNING" sign where the diagnostic result is WN, displays the "ATTENTION" sign where the diagnostic result is CT, and displays the "GOOD" sign where the diagnostic result is other than the above (step S41).

Where the diagnostic result is WN or CT, the abnormal condition can be reliably reported to the operator through transmission of an e-mail.

If the method of operating wind turbine 10 is changed, the diagnostic operation conditions and the threshold values also need to be changed. In this case also, the procedure from step S1 in FIG. 4 can be performed to change the diagnostic operation conditions and set a new threshold value. It is noted that the threshold values can be changed by the operator via monitoring terminal 340.

It is noted that in step S40 in FIG. 6, monitoring terminal 340 receives the diagnostic parameter value and the measurement data along with the diagnostic result. Monitoring terminal 340 can therefore readily provide a specialist with the latest and the optimal measurement data and the like to be evaluated and analyzed by the specialist, and provide an environment in which the measurement data and data related thereto can be displayed simultaneously on the monitor (not illustrated).

The specialist, therefore, can readily judge whether a detailed diagnosis is required or not, based on an image on the monitor.

(Measurement Results Displayed on Monitor of Monitoring Terminal)

Figure 7:
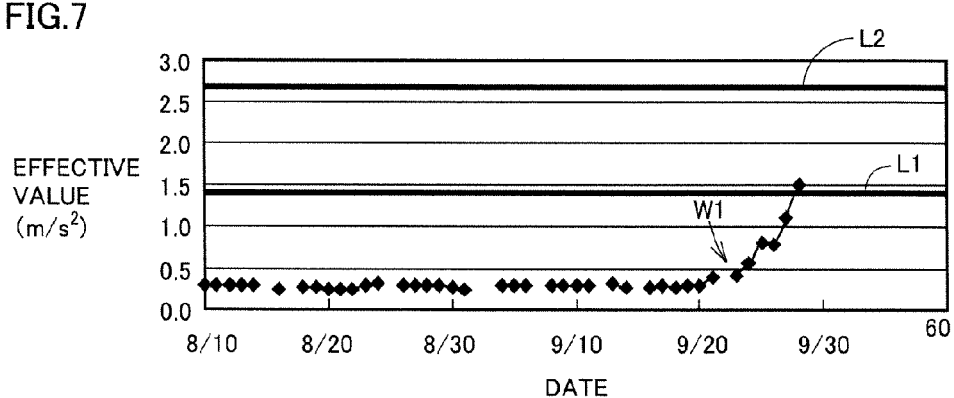
FIG. 7 is a diagram showing changes with time in the value of a diagnostic parameter displayed on the monitor of a monitoring terminal 340.

FIG. 7 is a diagram showing changes with time in the value of a diagnostic parameter displayed on the monitor of monitoring terminal 340. Referring to FIG. 7, the vertical axis represents the root-mean-square value, and the horizontal axis represents the date from the past 60 days. Waveform W1 shows changes with time of an exemplary diagnostic parameter. Solid lines L1 and L2 are displayed along with waveform W1. Solid line L1 represents a threshold value at which each apparatus is in a first condition (the "ATTENTION" condition described above), and solid line L2 represents a threshold value at which each apparatus is in a second condition (the "WARNING" condition described above), For example, when the value of the diagnostic parameter is thus displayed with passage of time on the display (not illustrated) of monitoring terminal 340, the specialist can comprehend that the root-mean-square value of the corresponding apparatus increases from around September 20, and exceeds the "ATTENTION" condition before September 30. The specialist can thus judge that this apparatus requires a further detailed diagnosis.

Even if the root-mean-square value does not exceed these threshold values, future trends can be predicted, for example, the value of the latest diagnostic parameter is on the rise, or the value of the latest diagnostic parameter is on the rise, but still has room before reaching the threshold value.

Figure 8:
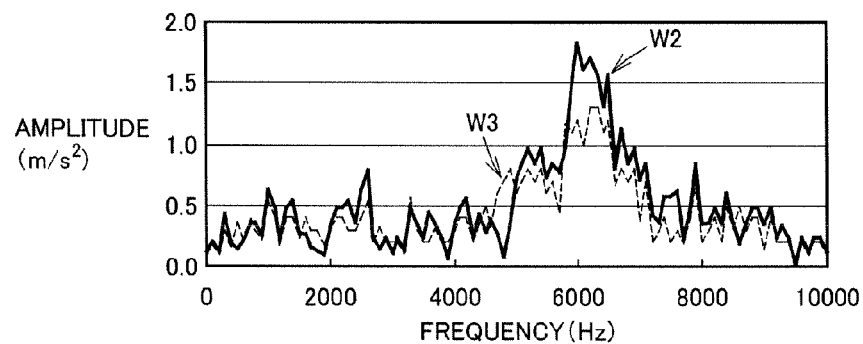
FIG. 8 is a diagram showing a frequency spectrum under certain operation conditions displayed on the monitor of monitoring terminal 340.

FIG. 8 is a diagram showing a frequency spectrum under certain operation conditions displayed on the monitor of monitoring terminal 340.

In FIG. 8, waveform W2 represents the latest measurement data, and waveform W3 represents a normal data frequency spectrum of a given date (in the past). The operation conditions when measuring waveforms W2 and W3 are the same. For an accurate comprehension of the condition of the apparatus represented by waveform W2, monitoring terminal 340 displays waveform W3 on waveform W2 for comparison. Through a comparison of waveforms W2 and W3, the specialist can readily comprehend whether the condition of the apparatus being monitored is close to the normal condition or the abnormal condition, allowing an evaluation of the measurement data to be made in a short time.

Figure 9:
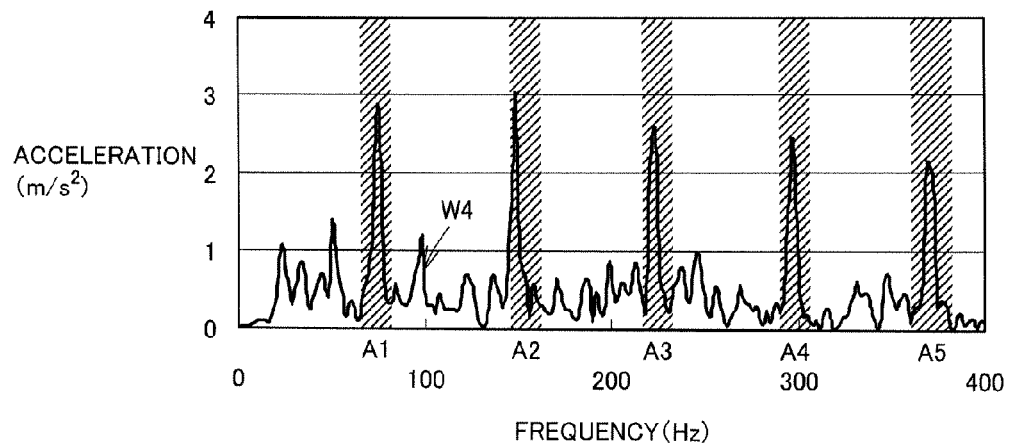
FIG. 9 is a diagram showing a vibration envelope spectrum of measurement data displayed on the monitor of monitoring terminal 340.

FIG. 9 is a diagram showing a vibration envelope spectrum of measurement data displayed on the monitor of monitoring terminal 340. Referring to FIG. 9, frequency regions A1 to A5 (hatched sections), which are displayed along with waveform W4, represent regions of primary to quinary defective frequencies (ball pass frequency of outer race, etc) with the inclusion of a tolerable range of 5%.

Such a tolerable range is provided to allow an abnormal condition of each apparatus of wind turbine 10 to be detected, even in cases where the measured frequency spectrum and the defective frequencies calculated in advance do not match one other, because the measurement time of the rotational speed and the measurement time of vibrations differ from each other, or the rotational speed changes between the start and the end of the measurement of vibrations.

The detection of an abnormality (detection of a defect) of each apparatus of wind turbine 10 is facilitated by including a tolerable range in the defective frequencies calculated in advance. Since the rotational speed changes particularly in the case of a wind turbine, the tolerable range is preferably set in accordance with changes in rotational speed.

It is noted that the above-described defective frequencies include, for example, a frequency generated when an outer race has a defect (ball pass frequency of outer race), a frequency generated when an inner race has a defect (ball pass frequency of inner race), and a frequency generated when a rolling element has a defect (ball spin frequency). The ball pass frequency of outer race, the ball pass frequency of inner race, and the ball spin frequency can be calculated in advance using the following equations (3) to (5), respectively:

$$\text{ball pass frequency of outer race: } Fo=(Fr/2)\times(1-(d/D)\times\cos\alpha)\times z \quad (3);$$

$$\text{ball pass frequency of inner race: } Fi=(Fr/2)\times(1+(d/D)\times\cos\alpha)\times z \quad (4); \text{ and}$$

$$\text{ball spin frequency: } Fb=(Fr/2)\times(D/d)(1-(d/D)^2\times\cos^2\alpha) \quad (5);$$

where "Fr" represents the rotational frequency (Hz), "d" represents the diameter (mm) of the rolling elements, "D" represents the pitch circle diameter (mm), "α" represents the contact angle, and "z" represents the number of the rolling elements. Furthermore, an $n^{th}$-order (n is a natural number) defective frequency can be found by calculating n×Fo, n×Fi, or n×Fb.

Second Embodiment

The condition monitoring system according to the first embodiment described above may measure, for example, an output current of the power generator to measure the output of the power generator of wind turbine 10. Clamp-type current sensors that can measure a current flowing in an electric wire by pinching the electric wire with the measurement conductor, without cutting the electric wire to be measured, have been used as sensors for measuring the current.

On the other hand, some sensors have a wireless communication function without requiring such cable wiring. The invention described in Japanese Patent Laying-Open No. 2008-171403, for example, aims to provide a wireless output sensor, a proximity sensor, a processing apparatus, and a control system that allow simplified wiring of a signal cable and the like.

Specifically, the wireless output sensor of the invention described in Japanese Patent Laying-Open No. 2008-171403 is characterized by including a sensor unit that detects an object to be detected, a wireless transmission unit that performs the processing of wirelessly transmitting sensor data on a detection by the sensor unit, a transmission antenna that transmits sensor data on the processing by the wireless transmission unit, and a battery mounting portion on which a battery serving as a power supply for each of the sensor unit and the wireless transmission unit is mounted.

In the invention described in Japanese Patent Laying-Open No. 2008-171403, any of the battery, power generated by sunlight, and power generated by vibrations is used as a power supply for the sensor and the wireless transmission unit.

The invention described in Japanese Patent Laying-Open No. 2008-171403, however, has problems in that the battery requires replacement, and the invention can only be used under special conditions allowing the battery to be charged using sunlight or vibrations.

Accordingly, to overcome the above-described problems, an object of one embodiment of the present invention is to provide a current sensor with a wireless transmission function that transmits a measured value (current value of the power generator) via wireless communication, by utilizing, as a power supply for wireless communication, a current drawn from a magnetic field induced around the electric wire to be measured.

Figure 10:
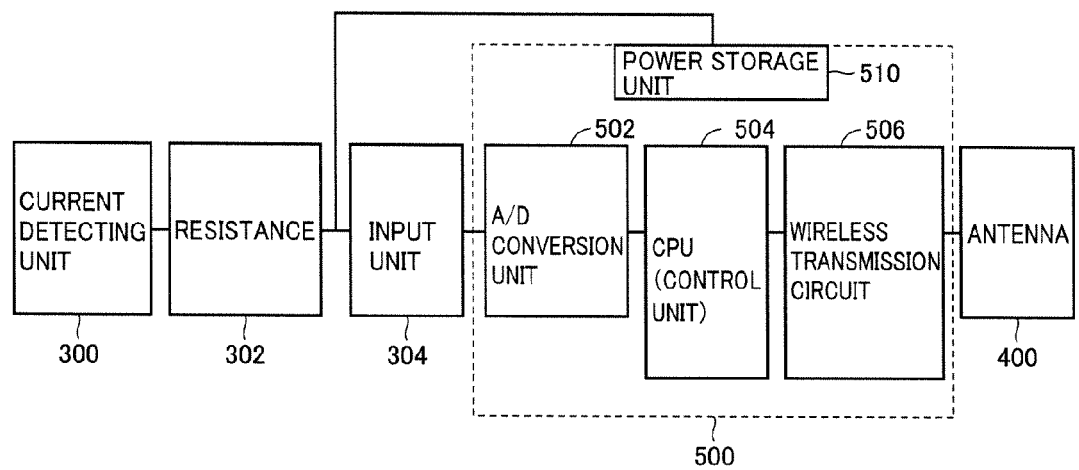
FIG. 10 is a block diagram illustrating the configuration of a wireless transmission-side sensor unit (wireless sensor module) 301 having a wireless transmission function.

FIG. 10 is a block diagram illustrating the configuration of a wireless transmission-side sensor unit (wireless sensor module) 301 having a wireless transmission function. Referring to FIG. 10, sensor unit 301 includes a current detecting unit (current sensor) 300 that measures an output current of the power generator, a resistance 302, an input unit 304, a wireless transmission unit 500 for wirelessly transmitting a measured value measured by current detecting unit 300, and an antenna 400. One example of sensor unit 301 may be a clamp-type current sensor having a wireless transmission function.

Wireless transmission unit 500 includes an A/D conversion unit 502 that converts an analog output signal from current detecting unit (current sensor) 300 into a digital signal, a CPU (control unit) 504 that controls the digital signal, and a wireless transmission circuit 506 that generates a high frequency signal for wireless communication. Wireless transmission unit 500 transmits the measured value (measurement data) as the high frequency signal to the receiving side (data server 330 in FIG. 1, for example) via antenna 400. Wireless transmission unit 500 further includes a power storage unit 510 that stores power as a power supply for the internal component circuits (A/D conversion unit 502 described above, for example). A current is drawn from a magnetic field induced by an alternating current component of the electric wire to be measured (output current of the power generator, for example) detected by current detecting unit 300, and power storage unit 510 stores this current for use as a power supply. It is noted that current detecting unit 300 may be used solely for causing a current to be stored in power storage unit 510, and a separate sensor (vibration sensor, for example) can be used to diagnose the condition of wind turbine 10.

Measurement of a current is performed as follows. A current that is output from an output terminal of current transformer clamp-type sensor unit 301 is converted into a voltage using resistance 302, and the converted voltage is input. The voltage is converted into a current value, based on the current-to-voltage relationship of the current transformer current sensor that is determined from the resistance value.

While it is described herein that power storage unit 510 is provided as a power supply for wireless transmission unit 500, power storage unit 510 may also be used as a power supply for the entire sensor unit 301.

Furthermore, antenna 400 may have nondirectivity or directivity with respect to the relationship between the direction and the intensity of the radiation of radio waves transmitted or received.

Figure 11:
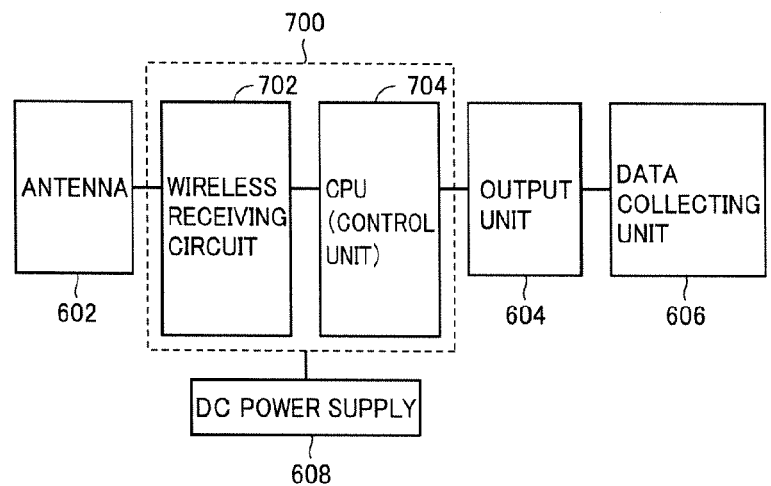
FIG. 11 is a block diagram illustrating one exemplary configuration of a wireless receiving-side receiving apparatus (wireless sensor module) 601.

FIG. 11 is a block diagram illustrating one exemplary configuration of a wireless receiving-side receiving apparatus (wireless sensor module) 601. Referring to FIG. 11, receiving apparatus 601 (monitoring apparatus 80 in FIG. 2, for example) includes antenna 602 for receiving radio waves, a wireless receiving unit 700 that converts a signal received via antenna 602, an output unit 604 that outputs the converted signal (measurement data), a data collecting unit 606 that collects and stores the measurement data, and a DC power supply 608 that supplies power to wireless receiving unit 700. While DC power supply 608 is described as a power supply for wireless receiving unit 700, it may also be used as a power supply for the entire receiving apparatus.

Wireless receiving unit 700 includes a wireless receiving circuit 702 that decodes the received signal and a CPU (control unit) 704 that controls wireless receiving circuit 702.

Specified low power radio, which can be used without receiving a license of a radio station in accordance with the Radio Law, can be used as a wireless communication system through which the measurement data is transmitted or received. A cost reduction can be achieved by providing such a system.

Lastly, the first and second embodiments will be summarized with figures and the like.

As illustrated in FIGS. 1 and 2, the first embodiment provides a condition monitoring system that diagnoses an abnormality of each of apparatuses 40 to 60 provided in wind turbine 10. The condition monitoring system includes monitoring apparatus 80 including a sensor provided for each apparatus, monitoring-side control apparatus (data server) 330, and monitoring terminal 340. Monitoring apparatus 80 transmits data measured in a first period (learning period) before diagnosis to the monitoring-side control apparatus. The monitoring-side control apparatus generates a threshold value based on the transmitted data (data for setting a threshold value). Then, in a second period (operation period) after the passage of the first period, the monitoring-side control apparatus diagnoses whether the apparatus has an abnormality or not based on the data collected by monitoring apparatus 80 and the threshold value corresponding to the data. The diagnostic result is displayed on monitoring terminal 340.

Preferably, the data for setting a threshold value is measured for each operation condition of wind turbine 10, the threshold value is determined for each operating condition, and the operation condition is defined as at least any one of physical quantities representing a wind velocity, a rotational speed of a main shaft, a rotational speed of a power generator shaft, an amount of power generated, and a torque of the power generator shaft.

Preferably, the measurement data includes data on at least any one of vibrations of each of apparatuses 40 to 60, an acoustic emission generated from each of apparatuses 40 to 60, a temperature of each of apparatuses 40 to 60, and an operating sound of each of apparatuses 40 to 60.

Preferably, the measurement data is converted into a diagnostic parameter representing a condition of each of apparatuses 40 to 60, and the diagnostic parameter includes any one of a root-mean-square value, a peak value, an average value, a crest factor, a root-mean-square value after envelope processing, and a peak value after envelope processing.

Preferably, monitoring apparatus 80 includes a transmission unit connectable to Internet 320, the transmission unit transmits the data for setting a threshold value, and data server 330 generates a threshold value based on extracted data extracted from the data for setting the threshold value, by using a statistical method.

Preferably, the condition monitoring system further includes a monitoring terminal 340 that controls monitoring apparatus 80, monitoring terminal 340 includes a monitor that displays the diagnostic result, and the monitor displays an apparatus diagnosed by monitoring-side control apparatus 330 as having an abnormality in the second period, as well as information on the abnormality of the apparatus.

More preferably, the monitor displays the measurement data corresponding to the same operation condition with passage of time.

Still more preferably, the data for setting the threshold value is measured for each operation condition of wind turbine 10, the threshold value is determined for each operation condition, and the monitor simultaneously displays a frequency spectrum of latest data out of the data, and a vibration spectrum of data stored in data server 330, corresponding to the same operation condition as the operation condition of the measurement data, and determined until now as being normal using the threshold value.

Even more preferably, the data for setting the threshold value is measured for each operation condition of wind turbine 10, the threshold value is determined for each operating condition, and the monitor simultaneously displays a frequency spectrum after envelope processing of latest data out of the data, and a frequency spectrum after envelope processing of data stored in data server 330, corresponding to the same operation condition as the operation condition of the data, and determined until now as being normal using the threshold value.

Still more preferably, the monitor simultaneously displays the frequency spectrum after envelope processing of the data, as well as a ball pass frequency of inner race, a ball pass frequency of outer race, and a ball spin frequency calculated in advance.

Even more preferably, the monitor displays the frequency spectrum of the data, as well as a rotational frequency and a gear meshing frequency related to an imbalance and a misalignment.

Still more preferably, the monitor displays the frequency spectrum after envelope processing of the data and the gear meshing frequency.

Preferably, the condition monitoring system further includes monitoring terminal 340 that controls monitoring apparatus 80, wherein the threshold value to be used by monitoring-side control apparatus 330 for the diagnosis can be modified via monitoring terminal 340.

Next, as shown in FIGS. 10 and 11, the second embodiment provides sensor unit 301 that monitors a condition of wind turbine 10. Sensor unit 301 includes current detecting unit 300 that draws a current to be used for wireless communication from a magnetic field induced by an alternating current component of an output current of each apparatus provided in wind turbine 10, and wireless transmission unit 500 for wirelessly transmitting the condition of wind turbine 10 monitored by sensor unit 301. Wireless transmission unit 500 includes power storage unit 510 that stores the current drawn by current detecting unit 300, for use as a power supply for wireless transmission unit 500.

Preferably, wireless transmission unit 500 includes A/D conversion unit 502 that converts an analog signal representing the condition of wind turbine 10 into a digital signal, processing unit 504 that processes the output from A/D conversion unit 502 for wireless transmission, and wireless transmission circuit 506 for transmitting the digital signal representing the condition of wind turbine 10 processed by processing unit 504.

More preferably, current detecting unit 300 draws a current to be used for wireless transmission unit 500 from the output current of the power generator provided in wind turbine 10.

Still more preferably, wireless transmission circuit 506 transmits the digital signal using the specified low power radio.

Preferably, sensor unit 301 further includes antenna 400 that transmits the condition of wind turbine 10 by radio waves, wherein antenna 400 has nondirectivity with respect to the relationship between the direction and the intensity of the radiation of radio waves transmitted or received.

Preferably, sensor unit 301 further includes antenna 400 that transmits the condition of wind turbine 10 by radio waves, wherein antenna 400 has directivity with respect to the relationship between the direction and the intensity of the radiation of radio waves transmitted or received.

Third Embodiment

A third embodiment relates to an apparatus and a method for monitoring a wind turbine, and more particularly to an apparatus and a method for monitoring a wind turbine for monitoring an inside of a housing that houses a main bearing, a gearbox, and a power generator of a wind turbine.

The operation condition of the wind turbine is remotely monitored with a Supervisory Control and Data Acquisition (SCADA) system or a Condition Monitoring System (CMS), for example. SCADA collects operation information such as the amount of power generated, the wind velocity, and the like of the wind turbine, and CMS monitors apparatuses of the wind turbine for damage, a deteriorated condition, and the like. On the other hand, other examples of such monitoring apparatuses have been proposed, for example, a monitoring apparatus that monitors the condition of discharge of grain of a grain-discharging apparatus of a combine when the operation state is switched from a stationary state to a driving state of discharging grain (see, for example, Japanese Patent Laying-Open No. 2005-237338).

In addition to the remote monitoring by SCADA or CMS, regular inspections (once a month, for example) are conducted for a wind turbine. In these inspections, a worker climbs up to the wind turbine, and visually checks the inside of the nacelle installed on the top of the tower of the wind turbine. In this case, the worker needs to climb up to the wind turbine and visually check the apparatuses housed in the nacelle for damage or a deteriorated condition. The inspection thus requires a long time. Therefore, if the worker can visually check the condition of the inside of the nacelle remotely without climbing up to the wind turbine, the work time required for the inspection can be shortened, and consequently the work load of the inspection can be lessened.

The third embodiment was made in view of the above-described problem, and an object of the third embodiment is to provide an apparatus and a method for monitoring a wind turbine that can lessen the work load of inspecting an inside of a housing that houses a main bearing, a gearbox, and a power generator of a wind turbine, and can inspect an inside of the housing in real time during the operation of the wind turbine.

The third embodiment will be more specifically described hereinafter, referring to the drawings.

Figure 12:
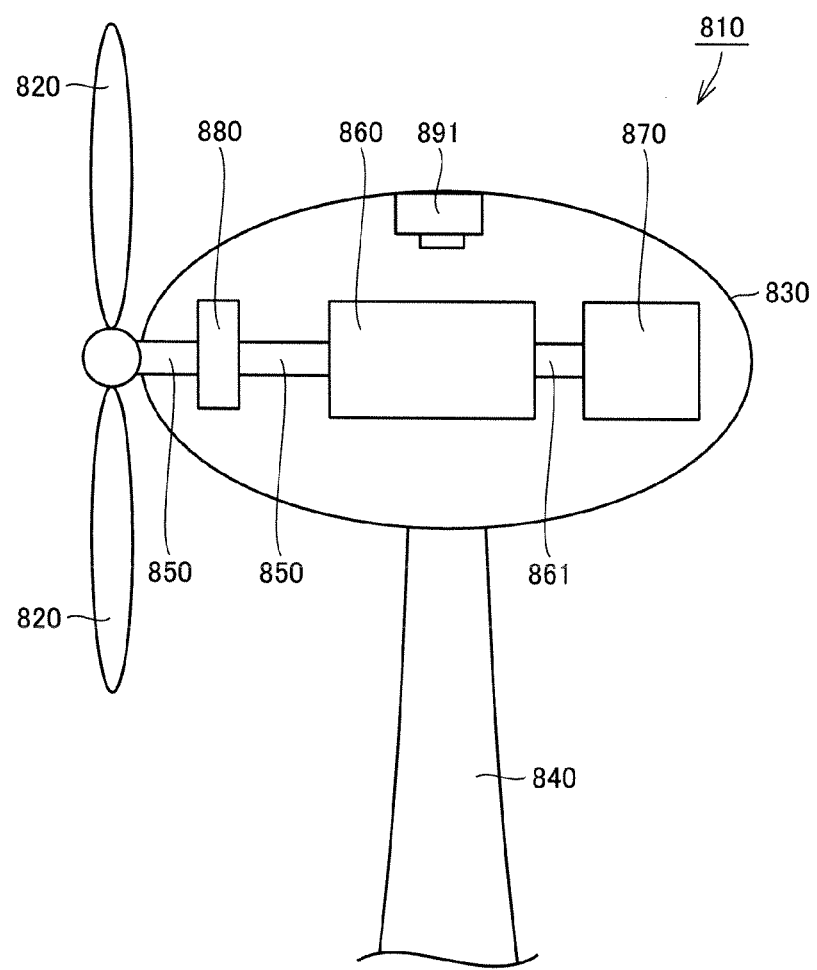
FIG. 12 is a schematic diagram illustrating the configuration of a wind turbine according to a third embodiment.

The configuration of a wind turbine according to the third embodiment will be described first. Referring to FIG. 12, a wind turbine 810 according to the third embodiment mainly includes blades 820, a nacelle 830 serving as a housing, a tower 840, a main shaft 850, a gearbox 860, a power generator 870, and a main bearing 880. Main shaft 850, gearbox 860, power generator 870, main bearing 880, and a camera 891 serving as a photographing unit are housed in nacelle 830. Camera 891 represents the apparatus for monitoring a wind turbine according to the third embodiment that will be described below.

Nacelle 830 is installed on the top of tower 840 set up on the ground (not illustrated), that is, it is installed at a high altitude. Blades 820 are connected to one end of main shaft 850 projecting outside through nacelle 830. Main shaft 850 is rotatably supported by main hearing 880 in nacelle 830. Gearbox 860 is connected to the other end of main shaft 850 opposite the one end to which blades 820 are connected. Main bearing 880 is a rolling bearing, for example, a self-aligning roller bearing, a conical roller bearing, a cylindrical roller bearing, or a ball bearing. Such a hearing may be a single-row or multi-row bearing.

Gearbox 860 is provided between main shaft 850 and power generator 870 in nacelle 830. Gearbox 860 increases the speed of the rotation of main shaft 850, and outputs the rotation of main shaft 850 having the increased speed to power generator 870 via an output shaft 861. Gearbox 860 is formed of, for example, a gear mechanism including a planetary gear, an intermediate shaft, a high speed shaft, and the like. Power generator 870 is connected to output shaft 861 of gearbox 860, and generates power with the rotation that is output from gearbox 860. Power generator 870 is an induction generator, for example.

The operation of the wind turbine according to the third embodiment will be described next. Referring to FIG. 12, blades 820 first rotate with the wind, which causes main shaft 850 connected to blades 820 to rotate while being supported by main bearing 880. The rotation of main shaft 850 is transmitted to gearbox 860, which increases the speed of the rotation, and the rotation of main shaft 850 is converted into rotation of output shaft 861. The rotation of output shaft 861 is then transmitted to power generator 870, which generates an electromotive force through electromagnetic induction action. The wind turbine according to the third embodiment operates in this way.

Figure 13:
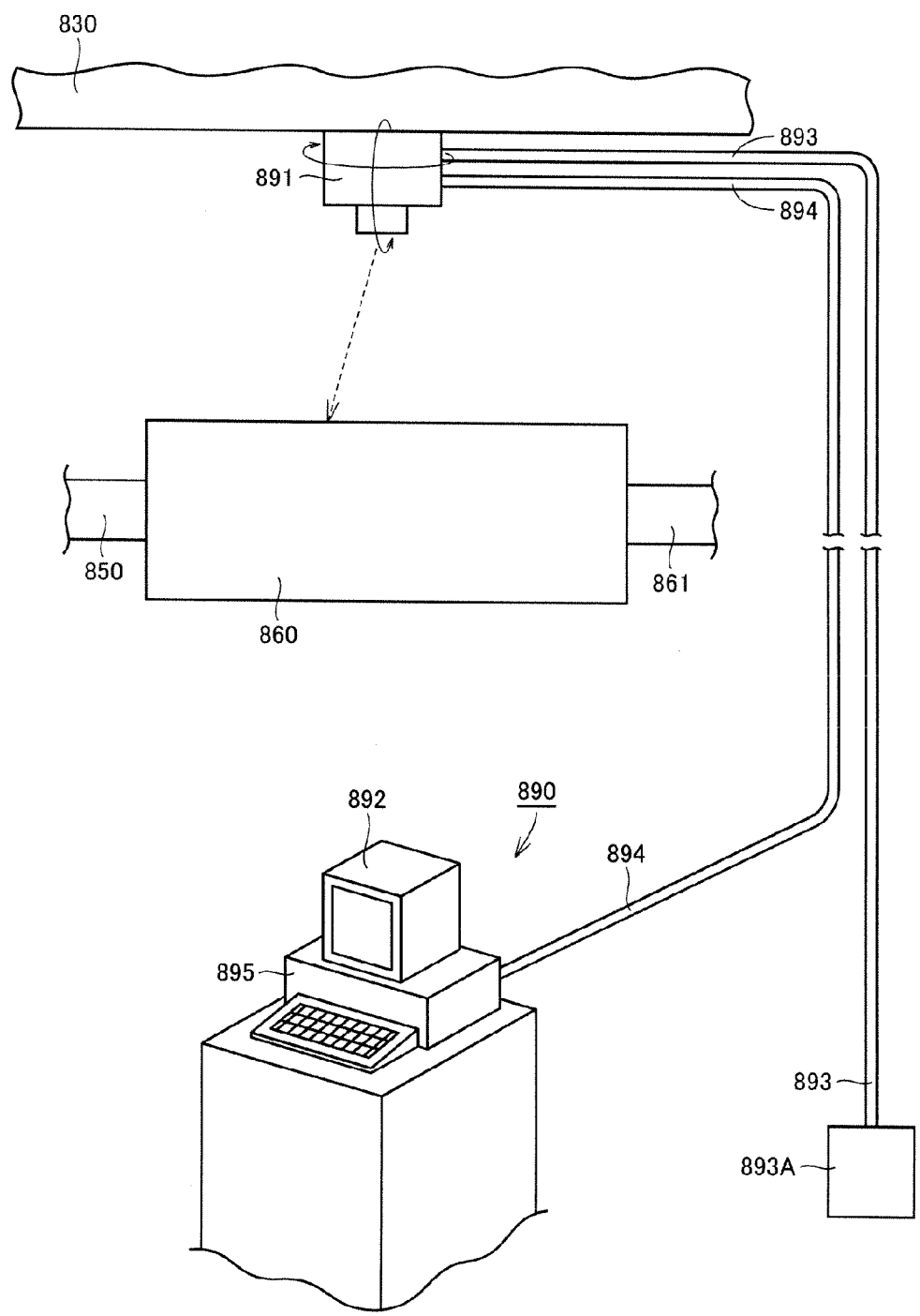
FIG. 13 is a schematic diagram illustrating the configuration of a monitoring apparatus for a wind turbine.

The configuration of the apparatus for monitoring a wind turbine according to the third embodiment will be described next. The apparatus for monitoring a wind turbine according to the third embodiment monitors the inside of nacelle 830 that houses main bearing 880, gearbox 860, and power generator 870 of wind turbine 810 according to the third embodiment. That is, the apparatus for monitoring a wind turbine according to the third embodiment monitors the inside of the nacelle of a wind turbine installed at a high altitude, such as nacelle 830. Referring to FIG. 13, the apparatus for monitoring a wind turbine according to the third embodiment mainly includes camera 891 serving as a photographing unit disposed inside nacelle 830 and a monitoring computer 890 disposed outside nacelle 830.

Camera 891 is fixed on the ceiling of nacelle 830, for example, to obtain an image of the inside of nacelle 830. Camera 891 is configured to be capable of panning and tilting as shown by the arrows in FIG. 13. A power cable 893 and a communication cable 894 are connected to camera 89L and the image of the inside of nacelle 830 obtained by camera 891 is transferred to monitoring computer 890 disposed outside nacelle 830 via communication cable 894.

Single camera 891 as illustrated in FIG. 13 or a plurality of cameras 891 may be disposed in nacelle 830. Camera 891 may be fixed on the ceiling of nacelle 830, although the invention is not limited thereto. Camera 891 may be disposed in a position where it can obtain images of the inside of nacelle 830. Camera 891 may be fixed on the bottom of nacelle 830, for example. Camera 891 may be a general camera for checking the external appearance of the inside of nacelle 830, but is not limited thereto. Camera 891 may also be an infrared camera, and is particularly preferably an infrared thermostat camera capable of checking a temperature distribution of an object to be monitored. Where a plurality of cameras 891 are disposed inside nacelle 830, both a general camera and an infrared thermostat camera may be disposed.

Monitoring computer 890 includes a monitor 892 serving as a display for displaying the image of the inside of nacelle 830 obtained by camera 891. Monitoring computer 890 is installed in a monitoring room (not illustrated) on the ground away from the wind turbine, for example. A computer body 895 of monitoring computer 890 includes memory serving as a storage unit that stores an image of a monitored region inside nacelle 830 obtained by camera 891. Once the image is stored in the memory, it can be displayed again on monitor 892. Furthermore, monitoring computer 890 is configured to be capable of detecting a rotational speed of main shaft 850 or the power generator shaft serving as a rotating member disposed inside nacelle 830, based on the image of the inside of nacelle 830 obtained by camera 891.

The monitoring method according to the third embodiment will be described next. The monitoring method according to the third embodiment is a method for monitoring the inside of nacelle 830 that houses main hearing 880, gearbox 860, and power generator 870 of wind turbine 810 according to the third embodiment. The monitoring method is performed by using the above-described apparatus for monitoring a wind turbine according to the third embodiment. Referring to FIG. 12 first, camera 891 disposed inside nacelle 830 of the wind turbine obtains an image of the inside of nacelle 830. When camera 891 is an infrared thermostat camera, the image of the inside of nacelle 830 obtained by camera 891 includes information on a temperature distribution inside nacelle 830.

Next, the condition of the inside of nacelle 830 is checked from the image of the inside of nacelle 830 displayed on monitor 892 of monitoring computer 890 disposed outside nacelle 830. Next, an apparatus inside nacelle 830 is checked in more detail for damage or a deteriorated condition, by comparing the image of the monitored region inside nacelle 830 obtained by camera 891 with an image of the monitored region obtained by camera 891 before the aforementioned image and stored in the memory of computer body 895. It is then determined, based on the comparison, whether maintenance of the apparatus inside nacelle 830 is required or not. The condition of the inside of nacelle 830 is checked in this way, completing the monitoring method according to the third embodiment.

As described above, in the apparatus for monitoring a wind turbine according to the third embodiment, an image of the inside of nacelle 830 of wind turbine 810 is obtained by camera 891, and the image is displayed on monitor 892 of monitoring computer 890 disposed outside nacelle 830. Thus, in the inspection of the inside of nacelle 830, the worker can visually check the condition of the inside of nacelle 830 from the outside, based on the image displayed on monitor 892 of monitoring computer 890 installed in the monitoring room on the ground, without climbing up to nacelle 830 installed at a high altitude to visually check the inside of nacelle 830. That is, the apparatus for monitoring a wind turbine according to the third embodiment allows the inside of nacelle 830 to be visually checked remotely, and can consequently lessen the work load of inspecting the inside of nacelle 830 of the wind turbine. The apparatus for monitoring a wind turbine according to the third embodiment also allows the inside of nacelle 830 to be visually checked in real time during the operation of wind turbine 810, based on the image of the inside of nacelle 830 displayed on monitor 892. This allows an inspection to be performed at any time, and the inspection cycle to be shorter. Therefore, the apparatus for monitoring a wind turbine according to the third embodiment can lessen the work load of inspecting the inside of nacelle 830 that houses main bearing 880, gearbox 860, and power generator 870 of the wind turbine, and can inspect the inside of nacelle 830 in real time during the operation of wind turbine 810.

Moreover, as described above, camera 891 may be configured to be capable of panning and tilting in the apparatus for monitoring a wind turbine according to the third embodiment. This allows camera 891 to obtain images of a broader region inside nacelle 830.

Figure 14:
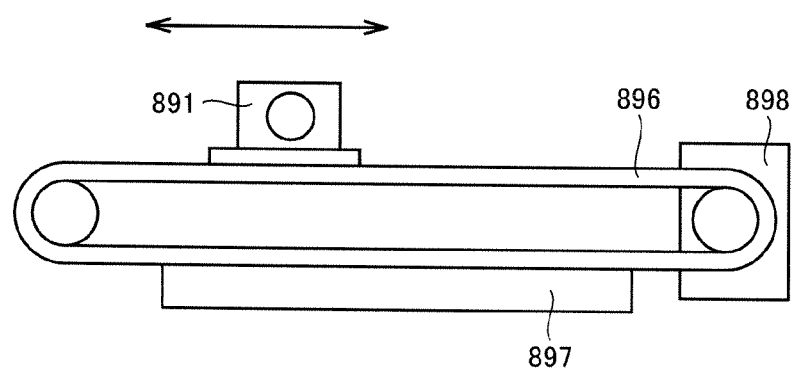
FIG. 14 is a schematic diagram illustrating the configuration of a photographing unit.

Furthermore, as described above, camera 891 may be fixed inside nacelle 830 in the apparatus for monitoring a wind turbine according to the third embodiment, although the invention is not limited thereto. That is, as illustrated in FIG. 14, camera 891 may be disposed on a belt 896 installed inside the nacelle, and disposed to be movable in the direction of the arrow shown in FIG. 14 along a rail 897, through the operation of a drive motor 898. This allows camera 891 to obtain images of a broader region inside nacelle 830, as in the case where camera 891 is configured to be capable of panning and tilting. When camera 891 is disposed to be capable of panning and tilting, and to be also movable inside nacelle 830, camera 891 can obtain images of an even broader region. It is noted that the panning, tilting, and movement of camera 891 along rail 897 can be controlled by monitoring computer 890 disposed outside nacelle 830.

As described above, in the apparatus for monitoring a wind turbine according to the third embodiment, camera 891 may include an infrared thermostat camera capable of checking the temperature distribution of an object to be monitored. This allows the temperature distribution inside nacelle 830 to be checked, in addition to the external appearance of the inside of nacelle 830. Consequently, the condition of the inside of nacelle 830 can be checked in more detail.

As described above, the apparatus for monitoring a wind turbine according to the third embodiment may further include memory serving as a storage unit that stores an image of a monitored region inside nacelle 830 obtained by camera 891. This allows an apparatus inside nacelle 830 to be checked for damage or a deteriorated condition, while comparing the image of the monitored region inside nacelle 830 obtained by camera 891 with an image of the monitored region obtained by camera 891 before the aforementioned image. Consequently, the apparatus inside nacelle 830 can be checked in more detail for damage or a deteriorated condition. When an infrared thermostat camera is adopted as camera 891, a change in temperature distribution inside nacelle 830 can be checked in more detail, by comparing information on one temperature distribution inside nacelle 830 with information on another temperature distribution inside nacelle 830 obtained before the aforementioned temperature distribution. The presence or absence of an abnormality of the apparatus inside nacelle 830 can then be determined based on the obtained information on the change in temperature distribution.

As described above, the apparatus for monitoring a wind turbine according to the third embodiment may be configured to be capable of detecting a rotational speed of main shaft 850 or the power generator shaft, based on the image of main shaft 850 or the power generator shaft inside nacelle 830 obtained by camera 891. In this way, the rotational speed of main shaft 850 or the power generator shaft can be detected without separately providing a mechanism such as a rotation detector that detects a rotational speed of main shaft 850 or the power generator shaft.

The third embodiment will be hereinafter summarized.

The apparatus for monitoring a wind turbine according to the third embodiment is an apparatus for monitoring an inside of a housing that houses a main hearing, a gearbox, and a power generator of a wind turbine, which includes the following features. The apparatus for monitoring a wind turbine according to the third embodiment includes a photographing unit disposed inside the housing to obtain an image of the inside of the housing, and a display disposed outside the housing to display the image of the inside of the housing obtained by the photographing unit.

In the apparatus for monitoring a wind turbine according to the third embodiment, the image of the inside of the housing of the wind turbine is obtained by the photographing unit, and the image is displayed on the display disposed outside the housing. Thus, in the inspection of the inside of the housing, the worker can visually check the condition of the inside of the housing, based on the image displayed on the display disposed outside the housing, without entering the housing to visually check the inside directly. Consequently, the work load of inspecting the inside of the housing of the wind turbine can be lessened. The apparatus for monitoring a wind turbine according to the third embodiment also allows the inside of the housing to be visually checked in real time during the operation of the wind turbine, based on the image of the inside of the housing displayed on the display. This allows an inspection to be performed at any time, and the inspection cycle to be shorter. Accordingly, the third embodiment provides an apparatus for monitoring a wind turbine that can lessen the work load of inspecting the inside of the housing that houses the main hearing, the gearbox, and the power generator of the wind turbine, and can inspect the inside of the housing in real time during the operation of the wind turbine. As used herein, the housing refers to the nacelle of the wind turbine.

In the apparatus for monitoring a wind turbine, the photographing unit may be configured to be capable of panning and tilting. The photographing unit may also be disposed to be movable inside the housing. This allows the photographing unit to obtain images of a broader region inside the housing.

In the apparatus for monitoring a wind turbine, the photographing unit may include an infrared thermostat camera. This allows the temperature distribution inside the housing to be checked, in addition to the external appearance of the inside of the housing. Consequently, the condition of the inside of the housing can be checked in more detail.

The apparatus for monitoring a wind turbine may further include a storage unit that stores an image of a monitored region inside the housing obtained by the photographing unit. This allows the image of the monitored region inside the housing obtained by the photographing unit to be compared with an image of the monitored region inside the housing obtained by the photographing unit before the aforementioned image and stored in the storage unit. Consequently, the condition of the inside of the housing can be checked in more detail.

The apparatus for monitoring a wind turbine may be configured to be capable of detecting a rotational speed of a rotating member disposed inside the housing, based on the image of the inside of the housing obtained by the photographing unit. In this way, the rotational speed of the rotating member can be detected without separately providing a mechanism for detecting a rotational speed of the rotating member.

The monitoring method according to the third embodiment is a method for monitoring an inside of a housing that houses a main bearing, a gearbox, and a power generator of a wind turbine, which includes the following steps. The monitoring method according to the third embodiment includes the steps of obtaining an image of the inside of the housing the photographing unit disposed inside the housing, and checking a condition of the inside of the housing, based on the image of the inside of the housing displayed on the display disposed outside the housing.

In the monitoring method according to the third embodiment, the condition of the inside of the housing can be checked by the above-described steps. Thus, in the inspection of the inside of the housing, the worker can visually check the condition of the inside of the housing, based on the image displayed on the display disposed outside the housing, without entering the housing to visually check the inside directly. Consequently, the work load of inspecting the inside of the housing of the wind turbine can be lessened. The monitoring method according to the third embodiment also allows the inside of the housing to be visually checked in real time during the operation of the wind turbine, based on the image of the inside of the housing displayed on the display. This allows an inspection to be performed at any time, and the inspection cycle to be shorter. As described above, the third embodiment provides a monitoring method that can lessen the work load of inspecting the inside of the housing that houses the main bearing, the gearbox, and the power generator of the wind turbine, and can inspect the inside of the housing in real time during the operation of the wind turbine.

In the monitoring method, the image of the inside of the housing obtained by the photographing unit may include information on a temperature distribution inside the housing. Consequently, the condition of the inside of the housing can be checked in more detail.

The monitoring method may further include the step of checking the condition of the inside of the housing by comparing an image of a monitored region inside the housing obtained by the photographing unit with an image of the monitored region obtained by the photographing unit before the aforementioned image. This allows the condition of the inside of the housing to be checked in more detail.

As is clear from the foregoing description, the third embodiment provides an apparatus and a method for monitoring a wind turbine that can lessen the work load of inspecting the inside of a housing that houses the main bearing, the gearbox, and the power generator of the wind turbine, and can inspect the inside of the housing in real time during the operation of the wind turbine.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The apparatus and the method for monitoring a wind turbine according to the present invention can be particularly advantageously used as an apparatus and a method for monitoring a wind turbine for which the work load of inspecting the inside of the housing that houses the main bearing, the gearbox, and the power generator of the wind turbine needs to be lessened.

REFERENCE SIGNS LIST

10: wind turbine; 20: main shaft; 30: blade; 40: gearbox; 50: power generator; 60: main bearing; 70A-70H: sensor; 80: monitoring apparatus; 90: nacelle; 100: tower; 300: current detecting unit; 301: sensor unit; 302: resistance; 304: input unit; 320: Internet; 330: data server; 330: monitoring-side control apparatus; 340: monitoring terminal; 400, 602: antenna; 500: wireless transmission unit; 502: A/D conversion unit; 504: processing unit; 506: wireless transmission circuit; 510: power storage unit; 601: receiving apparatus; 604: output unit; 606: data collecting unit; 608: power supply; 700: wireless receiving unit; 702: wireless receiving circuit; 810: wind turbine; 820: blade; 830: nacelle; 840: tower; 850: main shaft; 860: gearbox; 861: output shaft; 870: power generator; 880: main bearing; 890: monitoring computer; 891: camera; 892: monitor; 893: power cable; 894: communication cable; 895: computer body; 896: belt; 897: rail; 898: drive motor.

The invention claimed is:

1. A condition monitoring system that diagnoses an abnormality of an apparatus provided in a wind turbine, the condition monitoring system comprising:
a monitoring apparatus including a sensor provided for the apparatus;
a monitoring-side control apparatus that sets a threshold value to be used by the monitoring apparatus for diagnosing the abnormality of the apparatus during a diagnostic period, and diagnoses the abnormality of the apparatus based on the threshold value; and a monitoring terminal apparatus that monitors a condition of the apparatus, wherein:
the monitoring-side control apparatus transmits a diagnostic operation condition with which the monitoring-side control apparatus diagnoses the abnormality of the apparatus,
the monitoring apparatus gathers learning data, in a leaning period preceding the diagnostic period, with respect to an operation of the apparatus under the diagnostic operation condition, and transmits the learning data to the monitoring-side control apparatus,
the monitoring-side control apparatus generates the threshold value based on the learning data gathered by the monitoring apparatus in the learning period,
the monitoring apparatus gathers operating data, in the diagnostic period, with respect to the operation of the apparatus,
the monitoring apparatus transmits the operating data, gathered in the diagnostic period, to the monitoring-side control apparatus if an operation condition of the apparatus meets the diagnostic operation condition, and does not transmit the operating data if an operation condition of the apparatus does not meet the diagnostic operation condition, and
the monitoring-side control apparatus diagnoses whether the apparatus has an abnormality or not based on the operating data and the threshold value corresponding to the operating data, and transmits a diagnostic result to the monitoring terminal apparatus.

2. The condition monitoring system according to claim 1, wherein:
plural diagnostic operation conditions are set,
the learning data is measured for each of the diagnostic operation conditions,
the threshold value is determined for each of the diagnostic operation conditions, and
each of the diagnostic operation conditions defines at least any one of physical quantities representing a wind velocity, a rotational speed of a main shaft, a rotational speed of a power generator shaft, an amount of power generated, and a torque of the power generator shaft.

3. The condition monitoring system according to claim 1, wherein
the learning data and the operating data respectively include data on any one of vibrations of the apparatus, an acoustic emission generated from the apparatus, a temperature of the apparatus, and an operating sound of the apparatus.

4. The condition monitoring system according to claim 1, wherein
the operating data gathered by the monitoring apparatus in the diagnostic period is converted into a diagnostic parameter representing the condition of the apparatus,
the diagnostic parameter includes any one of a root-mean-square value, a peak value, an average value, a crest factor, a root-mean-square value after envelope processing, and a peak value after envelope processing, and
the monitoring apparatus transmits the diagnostic parameter to the monitoring-side control apparatus if the operation condition of the apparatus meets the diagnostic operation condition.

5. The condition monitoring system according to claim 1, wherein:
the monitoring apparatus is connectable to the Internet, and
the monitoring-side control apparatus generates the threshold value from the learning data by using a statistical method.

6. The condition monitoring system according to claim 1, further comprising:
a monitoring terminal that controls the monitoring apparatus, wherein
the threshold value to be used by the monitoring-side control apparatus for the diagnosis is modified via the monitoring terminal.

7. The condition monitoring system according to claim 1, wherein:
the condition monitoring system monitors plural apparatuses provided in the wind turbine,
the condition monitoring system further includes a monitoring terminal that controls the monitoring apparatus,
the monitoring terminal includes a display that displays the diagnostic result, and
the display displays one of the apparatuses, which is diagnosed by the monitoring-side control apparatus as having an abnormality in the diagnostic period, as well as information on the abnormality of the one of the apparatuses.

8. The condition monitoring system according to claim 7, wherein
the display displays the operating data corresponding to the same diagnostic operation condition with passage of time.

9. The condition monitoring system according to claim 7, wherein:
plural diagnostic operation conditions are set,
the learning data is gathered for each of the diagnostic operation conditions,
the threshold value is determined for each of the diagnostic operation conditions, and
the display simultaneously displays a frequency spectrum of latest operating data out of the operating data, and a frequency spectrum of operating data stored in the monitoring-side control apparatus, corresponding to the same diagnostic operation condition as the diagnostic operation condition of the operating data, and determined until now as being normal using the threshold value.

10. The condition monitoring system according to claim 7, wherein:
plural diagnostic operation conditions are set,
the learning data is gathered for each of the diagnostic operation conditions,
the threshold value is determined for each of the diagnostic operation conditions, and
the display simultaneously displays a frequency spectrum after envelope processing of latest operating data out of the operating data, and a frequency spectrum after envelope processing of operating data stored in the monitoring-side control apparatus, corresponding to the same diagnostic operation condition as the diagnostic operation condition of the operating data, and determined until now as being normal using the threshold value.

11. The condition monitoring system according to claim 1, wherein:
the monitoring apparatus gathers basic data, in a set-up period preceding the learning period, with respect to an operation of the apparatus, and transmit the basic data to the monitoring-side control apparatus, and
the diagnostic operation condition is determined based on the basic data.

12. The condition monitoring system according to claim 1, wherein
the diagnostic operation conditions defines a range of at least one of physical quantities representing a wind velocity, a rotational speed of a main shaft, a rotational speed of a power generator shaft, an amount of power generated, and a torque of the power generator shaft.

13. The condition monitoring system according to claim 1, wherein:
the threshold includes a first threshold and a second threshold, and
the monitoring terminal apparatus displays a first alert corresponding the first threshold and a second alert corresponding the second threshold indicating a higher abnormality than the first alert.

* * * * *